(12) United States Patent
Matsunaga et al.

(10) Patent No.: US 6,904,022 B2
(45) Date of Patent: Jun. 7, 2005

(54) DATA TRANSFER CONTROL DEVICE, INFORMATION STORAGE MEDIUM AND ELECTRONIC EQUIPMENT

(75) Inventors: Kosuke Matsunaga, Oita (JP); Hiroyuki Kanai, Shiojiri (JP); Shinichiro Fujita, Beppu (JP)

(73) Assignee: Seiko Epson Corporation, Tokyo (JP)

( * ) Notice: Subject to any disclaimer, the term of this patent is extended or adjusted under 35 U.S.C. 154(b) by 979 days.

(21) Appl. No.: 09/737,760

(22) Filed: Mar. 23, 2001

(65) Prior Publication Data

US 2001/0042141 A1 Nov. 15, 2001

(30) Foreign Application Priority Data

Dec. 20, 1999 (JP) .......................................... 11-361103

(51) Int. Cl.[7] .............................................. H04L 12/28
(52) U.S. Cl. ........................ 370/257; 370/254; 370/255
(58) Field of Search ................................ 370/259, 255, 370/257, 267

(56) References Cited

U.S. PATENT DOCUMENTS 6,160,796 A * 12/2000 Zou .......................... 370/257
6,389,496 B1 * 5/2002 Matsuda ..................... 710/316

FOREIGN PATENT DOCUMENTS

| EP | 0 859 324 A2 | 8/1998 |
| JP | 10-257080 A | 9/1998 |
| JP | 11-194902 A | 7/1999 |
| JP | A 11-252153 | 9/1999 |
| JP | A 11-261608 | 9/1999 |
| JP | A 2000-32005 | 1/2000 |
| JP | A 2001-86132 | 3/2001 |

OTHER PUBLICATIONS

U.S. Appl. No. 10/781,721, filed Feb. 20, 2004, Fujita et al.

* cited by examiner

Primary Examiner—Wellington Chin
Assistant Examiner—Mark A Mais
(74) Attorney, Agent, or Firm—Oliff & Berridge, PLC

(57) ABSTRACT

The objective of the present invention is to provide a data transfer control device, information storage medium, and electronic equipment that can relieve the inconveniences caused whenever a reset that clears node topology information occurs. If a bus reset occurs during a data transfer period in a data transfer control device in accordance with the IEEE 1394 standard, and also the content of ORBs before and after the bus reset is the same, data transfer restarts from a resumption at the point at which the bus reset occurred, thus preventing duplicate printing in a printer. Whenever a bus reset occurs during a data transfer period, the continuation flag is set to on. The first command block ORB comprising a print command that transferred in after the bus reset is used in the comparison with the pre-bus-reset ORB. When no ACK is returned from the initiator because of a bus reset, a transition to a dead state occurs. The part of transfer data from a scanner that has not yet been transferred to the initiator at point at which the bus reset occurred is retained without being destroyed.

32 Claims, 24 Drawing Sheets

FIG. 6A
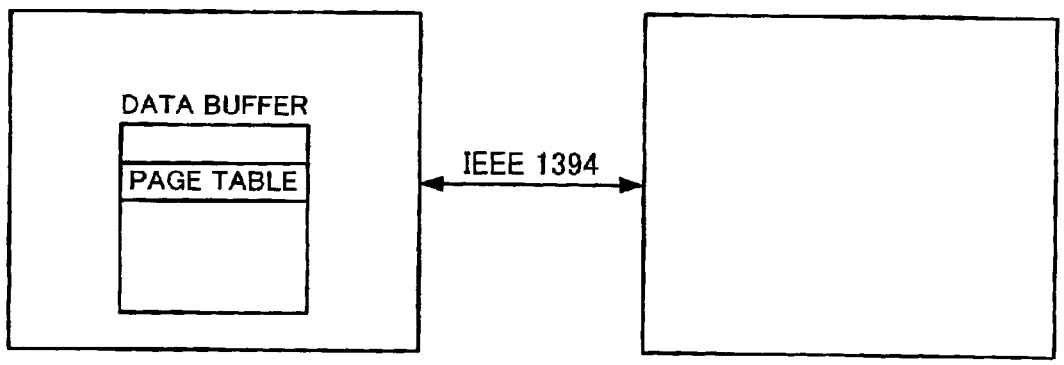
FIG. 6B  WHEN A PAGE TABLE EXISTS
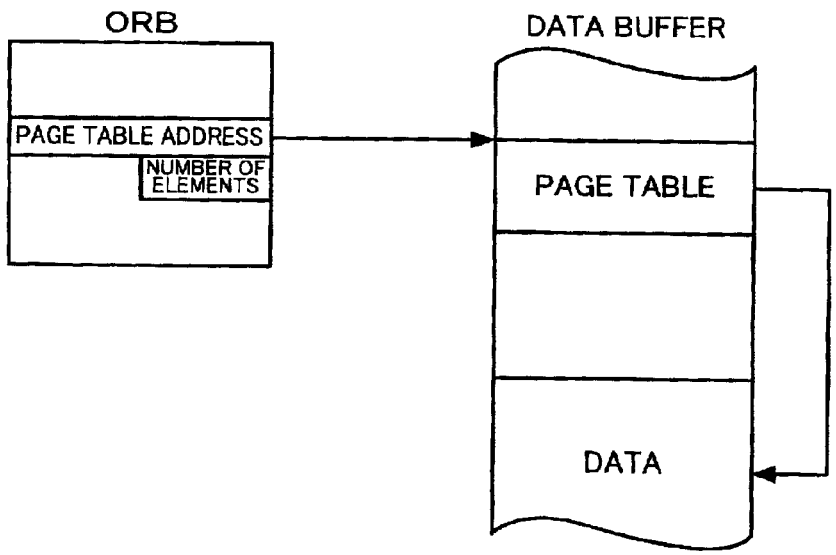
FIG. 6C  WHEN NO PAGE TABLE EXISTS
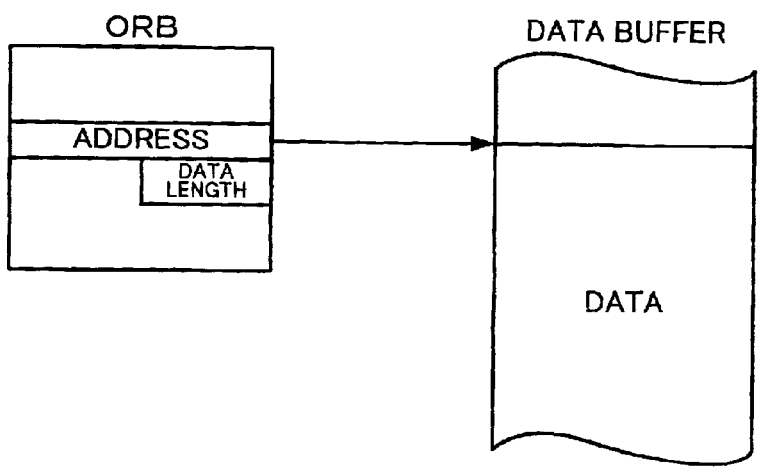

FIG. 12
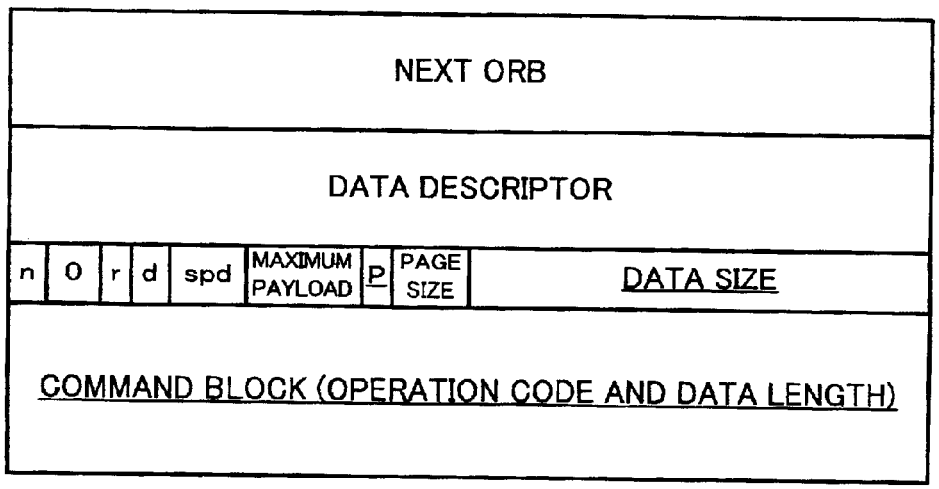
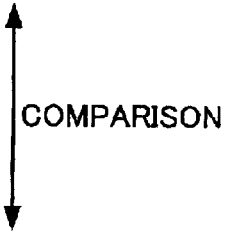
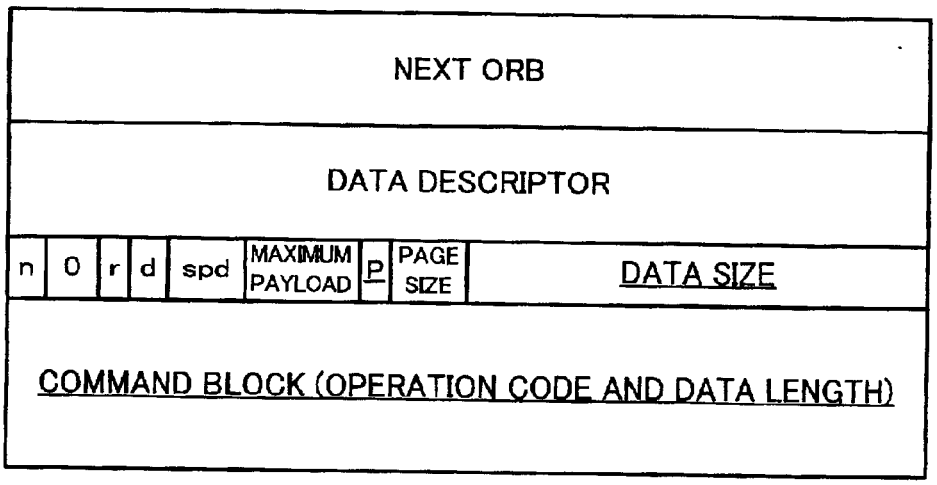

BUS RESET OCCURRENCE
(DURING RECONNECTION)

DURING NORMAL OPERATION

DATA TRANSFER CONTROL DEVICE, INFORMATION STORAGE MEDIUM AND ELECTRONIC EQUIPMENT

BACKGROUND OF THE INVENTION

1. Field of the Invention

The present invention relates to a data transfer control device, an information storage medium, and electronic equipment, and, in particular, to a data transfer control device, an information storage medium, and electronic equipment for performing data transfer that is based on a standard such as IEEE 1394 between a plurality of nodes that are connected by a bus.

2. Description of the Related Art

An interface standard called IEEE 1394 has recently been attracting much attention. This IEEE 1394 lays down standards for high-speed serial bus interfaces that can handle the next generation of multimedia devices. IEEE 1394 makes it possible to handle data that is required to have real-time capabilities, such as moving images. A bus in accordance with IEEE 1394 can be connected not only to peripheral equipment for computers, such as printers, scanners, CD-RW drives, and hard disk drives, but also to domestic appliances such as video cameras, VCRs, and TVs. This standard is therefore expected to enable a dramatic acceleration of the digitalization of electronic equipment.

Under this IEEE 1394, an event called a bus reset occurs when new electronic equipment is connected to the bus, electronic equipment is removed from the bus, or the number of nodes connected to the bus increases. When a bus reset occurs, the topology information relating to the nodes is cleared then this topology information is automatically reset. In other words, after a bus reset, tree identification (determination of the root node) and self identification are performed, then the nodes that are to act as management nodes, such as the isochronous resource manager, are determined. Ordinary packet transfer then restarts.

Since the topology information is automatically reset after a bus reset under this IEEE 1394, it is possible to plug in cables in a state called a hot state (hot-plugging). For that reason, it makes it possible for a user to freely plug in cables in the same manner as with ordinary domestic electrical appliances such as VCRs, which could be a useful factor in popularizing home network systems.

However, it has become clear that there are some technical problems caused by the occurrence of such a bus reset with devices such as printers or scanners that are connected to an IEEE 1394 bus, as described below.

If a bus reset occurs during the transfer of print data on an IEEE 1394 bus, the initiator, such as a personal computer, restarts the transfer of print data from the beginning. This causes a problem in the printer that is the target, in that some of the print data will be sent twice, resulting in erroneous printing such as duplicate printing.

With a scanner, once the head has moved out, it is not possible to return the head to its original position to obtain the same data again. This raises a problem in that it is not possible to continue the data transfer after the occurrence of a bus reset, even if the initiator restarts the data transfer from the beginning.

Note that various techniques have been proposed in the art to resolve the inconveniences caused by the occurrence of bus resets, such as that disclosed in Japanese Patent Application Laid-Open No. 11-194902, by way of example. With this prior-art technique, when a bus reset occurs, data processing is held then restarted after the network configuration has been rebuilt.

However, transfer data is simply resent after a bus reset with this prior-art technique, and it is not possible to determine whether the resent transfer data is a resumption of transfer data that was sent before the bus reset occurred. The problem of duplicate printing can therefore not be solved by this prior-art technique.

SUMMARY OF THE INVENTION

The present invention was devised in the light of the above described technical problems and has as an objective thereof the provision of a data transfer control device, an information storage medium, and electronic equipment that make it possible to resolve the inconvenience that is caused whenever a reset that clears the node topology information occurs.

To solve the above described problem, the present invention relates to a data transfer control device for transferring data among a plurality of nodes that are connected to a bus, the data transfer control device comprising:

determination means for determining whether or not a reset that clears node topology information has occurred during a data transfer period between a start of data transfer with respect to another node until a completion of the data transfer;

command comparison means for comparing a content of a first command packet for a data transfer operation request that was transferred from the other node before the reset occurred and a content of a second command packet for a data transfer operation request that was transferred from the other node after the reset occurred; and restart means for restarting data transfer as a resumption of data transfer at a point at which the reset occurred, when it is determined that the reset that clears node topology information has occurred within the data transfer period and also when it is determined that the contents of the first and second command packets are the same.

With the present invention, the system determines whether or not a reset that clears node topology information has occurred during a data transfer period. The content of a first command packet that was transferred in before the reset occurred are compared with the content of a second command packet that was transferred in after the reset occurred. When it is determined that the reset has occurred during the data transfer period and also when it determined that the contents of the first and second command packets are the same, the configuration is such that the data transfer restarts from a resumption at the point at which the reset occurred (such as the next data after the data whose transfer had been completed at the point at which the reset occurred).

On the other hand, if it is determined that the first and second command packets do not have the same content, by way of example, the configuration is such that the processing of the second command packet after the reset is done from the beginning.

With the present invention, therefore, the data transfer can be restarted from a resumption at the point at which the reset occurred, when the other node issues a transfer request for a command packet with the same content as that before the reset after the reset has occurred. This solves the problems caused by the duplicate transfer of data to an upper-layer device of the data transfer control device, by way of example, which could cause errors in the upper-layer device.

Note that it is preferable that the determination means determines that the reset has occurred during the data transfer period, when the first command packet for a data transfer operation request is being processed at a point at which the reset that clears node topology information occurred, and also when data transfer has already been performed in accordance with the first command packet and no data transfer completion status has been transferred to the other node.

With the present invention, the determination means may set a continuation flag to on, to indicate that data transfer is possible to restart in continuation, when it is determined that the reset that clears node topology information has occurred during the data transfer period. This makes it possible to omit the command packet comparison processing when the continuation flag is off. This reduces the processing load by ensuring that the content of unnecessary command packet is not compared.

With the present invention may further comprise command storage means for storing information for specifying an address for the restart of data transfer and content of the first command packet for a data transfer operation request, from after an occurrence of the reset up to the restart of data transfer. If information is stored in this manner, it becomes possible to implement the data transfer restart processing in a simple manner.

With the present invention, the command comparison means may take an initial command packet for a data transfer operation request among command packets that have been transferred from the other node after the reset that clears node topology information has occurred, to use as the second command packet for comparison with the first command packet. This configuration makes it possible to defer the execution of the comparison of command packet content until a command packet is transferred in for an initial data transfer operation request. This prevents unnecessary comparison of command packet content, thus reducing the processing load.

With the present invention, a state transition to a data transfer disabled state may occur when a data transfer completion status has been transferred to the other node but no acknowledgment has returned from the other node because of an occurrence of the reset that clears node topology information. When no acknowledgment comes in from the other node in this manner, it is not clear whether the other node has received the status. When data transfer starts from a resumption at the point at which the reset occurred, it is therefore possible that erroneous data transfer will be performed. With the present invention, when no acknowledgment comes in from the other node because of the reset that clears node topology information, a state transition to data transfer disabled occurs, making it possible to prevent a situation in which such erroneous data transfer would occur.

With the present invention, transfer data that has not been transferred to the other node at a point at which the reset that clears node topology information had occurred, from within transfer data that has been transferred from an upper-layer device, may be retained without being destroyed. This configuration makes it possible to prevent the inconvenience that is caused by situations such as the loss of data fetched by a scanner or the like, caused by the occurrence of the reset.

Note that this reset in accordance with the present invention is preferably a bus reset as defined by the IEEE 1394 standard.

The present invention further relates to a computer-usable information storage medium including a program for controlling data transfer to and from the above described data transfer control device, the information storage medium comprising:

a program for creating a second command packet having the same content as a first command packet for a data transfer operation request that has been transferred before an occurrence of a reset that clears node topology information, in order to issue a transfer request with respect to the data transfer control device, when the reset occurs during a transfer period. This configuration makes it possible to prevent a situation in which data transfer restart processing is performed in error, thus preventing the occurrence of any inconvenience caused by a reset.

Electronic equipment in accordance with the present invention comprises any one of the above described data transfer control devices; a device for performing given processing on data that has been received from another node through the data transfer control device and the bus; and a device for outputting or storing data that has been subjected to processing. Alternatively, electronic equipment in accordance with the present invention comprises any one of the above described data transfer control devices; a device for performing given processing on data that is to be transferred to another node through the data transfer control device and the bus; and a device for taking in (fetching) data to be subjected to processing.

The present invention make it possible to prevent a situation in which inconveniences are caused to the system by the occurrence of a reset that clears node topology information, thus making it possible to prevent erroneous operation of such electronic equipment. It also makes it possible to increase the speed of data transfer, reduce the cost of electronic equipment, and increase the processing speed of electronic equipment.

BRIEF DESCRIPTION OF THE DRAWINGS

FIGS. 6A, 6B, and 6C illustrate page tables.

FIG. 12 is illustrative of the comparison of ORB content.

FIG. 15 is illustrative of a method of deferring command comparison processing until the first command block ORB comprising a print command comes in.

DETAILED DESCRIPTION OF PREFERRED EMBODIMENTS

Preferred embodiments of the present invention are described below with reference to the accompanying drawings.

1. IEEE 1394

The description first relates to an outline of IEEE 1394.

1.1 Outline

The IEEE 1394 standard (IEEE 1394-1995, P1394.a) enables high-speed data transfer at 100 to 400 Mbps (P1394.b concerns 800 to 3,200 Mbps). It also permits the connection of nodes of different transfer speeds to the same bus.

The nodes are connected in a tree configuration in which a maximum of 63 nodes can be connected to one bus. Note that the use of bus bridges enables the connection of approximately 64,000 nodes.

IEEE 1394 provides for asynchronous transfer and isochronous transfer as packet transfer methods. In this case, asynchronous transfer is suitable for data transfers where reliability is required and isochronous transfer is suitable for transfers of data such as moving images and audio, where real-time capabilities are required.

1.2 Layer Structure

Figure 1:
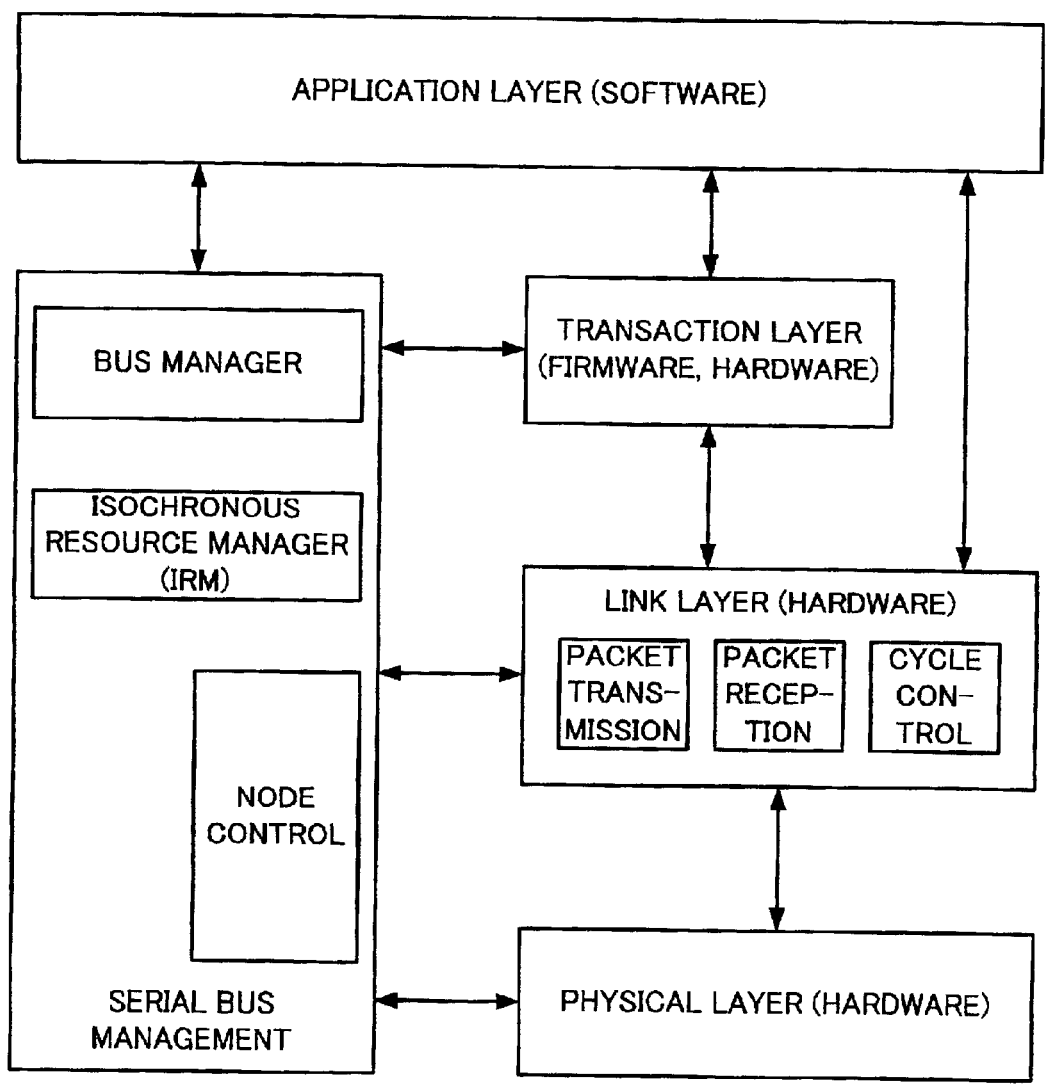
FIG. 1 shows the layer structure of IEEE 1394.

The layer structure (protocol structure) covered by IEEE 1394 is shown in FIG. 1.

The IEEE 1394 protocol comprises a transaction layer, a link layer, and a physical layer. The serial bus management function monitors and controls the transaction layer, link layer, and physical layer, and provides various functions for controlling nodes and managing bus resources.

The transaction layer provides an interface (service) for transaction units within upper layers and a link layer for lower layers, and executes transactions such as read transactions, write transactions, and lock transactions.

In this case, a read transaction causes data to be transmitted from the responding node to the node that requested the data. Similarly, a write transaction causes data to be transmitted from the request node to the responding node. A lock transaction causes data to be transmitted from the request node to the responding node, and the responding node then processes that data and returns it to the request node.

The link layer provides functions such as addressing, data check, data framing for packet transmission/reception, and cycle control for isochronous transfer.

The physical layer converts the logical symbols used by the link layer into electrical signals, performs bus arbitration, and defines the physical bus interface.

1.3 SBP-2

Figure 2:
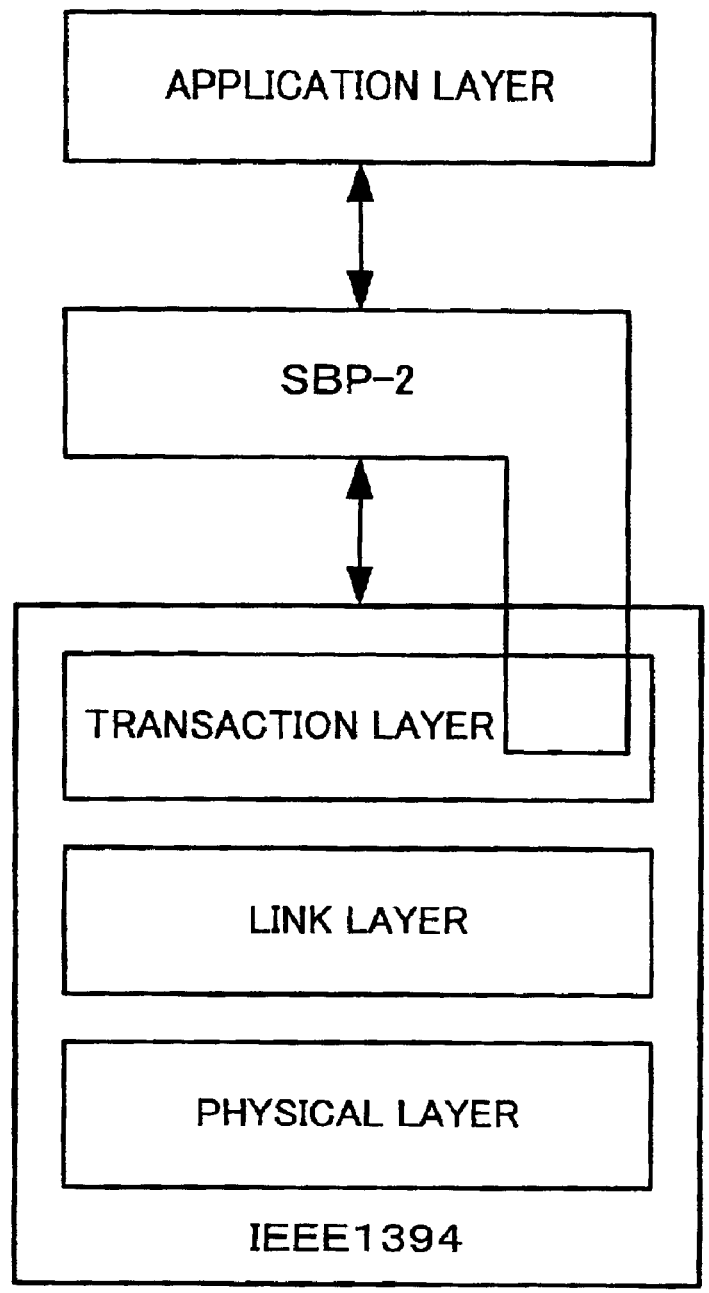
FIG. 2 illustrates the SBP-2.

A protocol called the serial bus protocol 2 (SBP-2) has been proposed as a higher-order protocol that comprises some of the functions of the transaction layer under IEEE 1394, as shown in FIG. 2.

In this case, SBP-2 is proposed in order to enable utilization of the SCSI command set on top of the IEEE 1394 protocol. Use of this SBP-2 minimizes the changes to be made to the SCSI command set that is used in electronic equipment that conforms to the existing SCSI standards, and also enables their use in electronic equipment that conforms to the IEEE 1394 standard. The design and development of electronic equipment can be simplified thereby. Since it is also possible to encapsulate device-specific commands, not just SCSI commands, this increases the universality of the command set.

Figure 3:
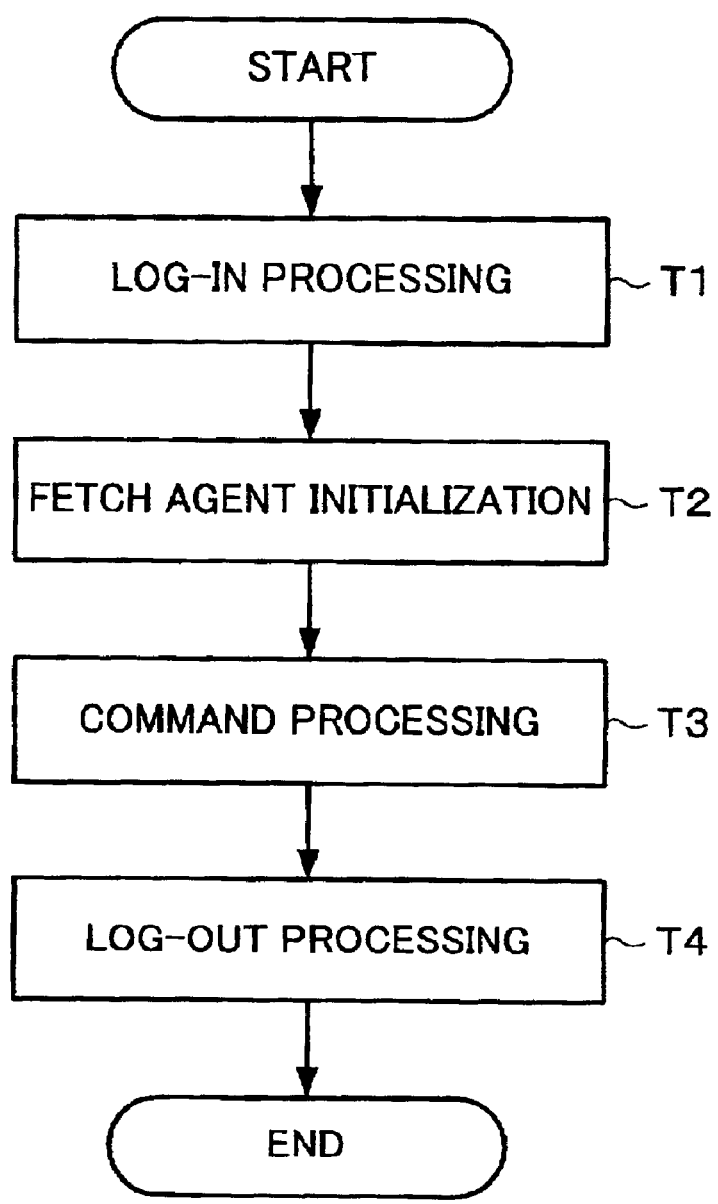
FIG. 3 illustrates the concept of data transfer processing under SBP-2.

With SBP-2, log-in processing is done by first using a log-in operation request block (ORB) created by an initiator (such as a personal computer), as shown in FIG. 3 (step T1). A dummy ORB is then used to initialize a fetch agent (step T2). A command is executed by using a normal command ORB (step T3), and finally log-out processing is done by a log-out ORB (step T4).

Figure 4:
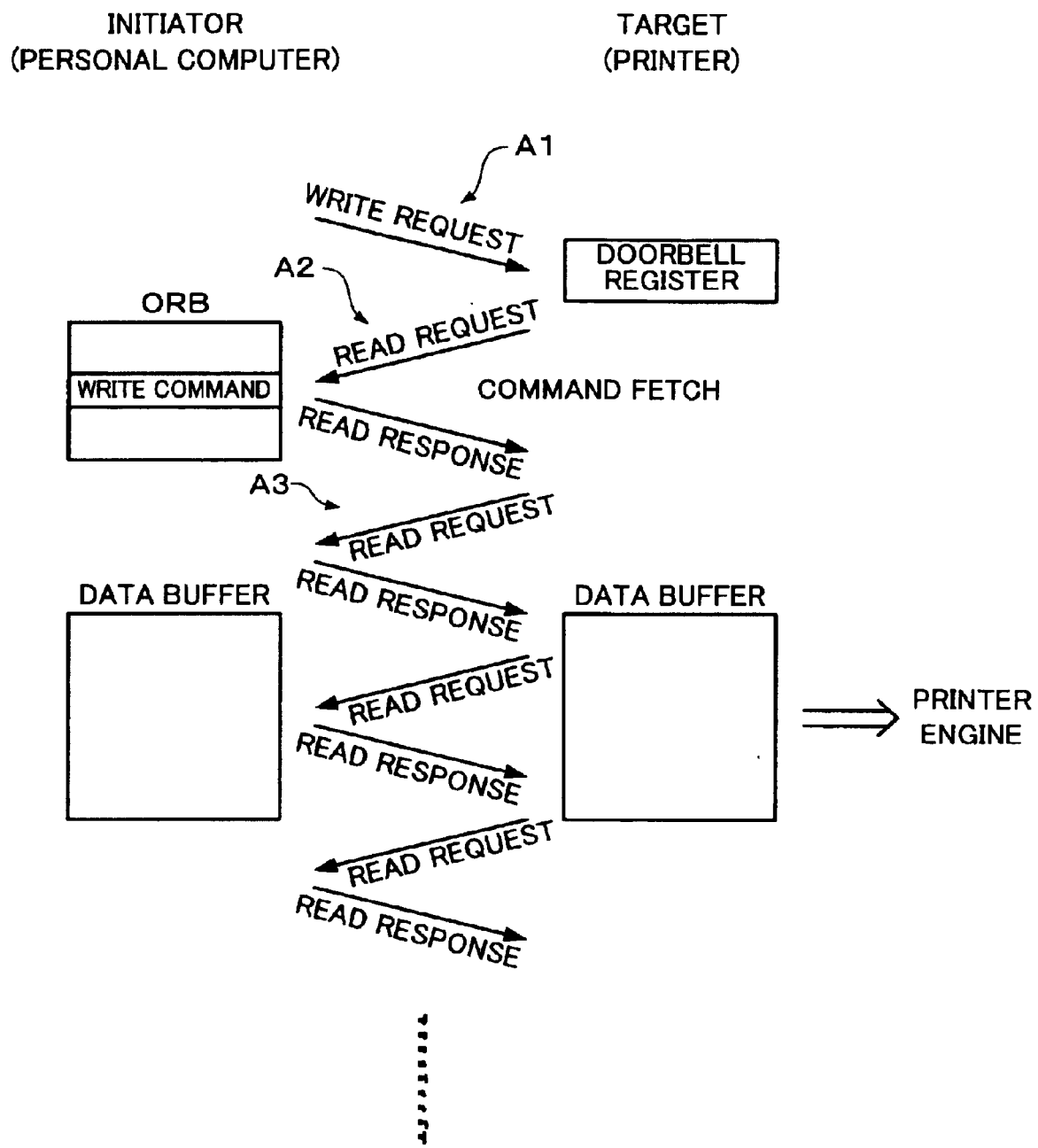
FIG. 4 illustrates command processing when data is transferred from an initiator to a target.

During the command processing of step T3 in this case, the initiator transmits a write request packet (executes a write request transaction) to ring a doorbell register of the target, as shown at A1 in FIG. 4. When that happens, the target transmits a read request packet and the initiator returns a read response packet, as shown at A2. This causes the ORB created by the initiator (a command block ORB) to be fetched into a data buffer at the target. The target analyzes any commands comprised within the fetched ORB.

When a command comprised within the ORB is a SCSI write command, the target transmits a read request packet to the initiator and the initiator returns the corresponding read response packet, as shown at A3. This causes the data that is stored in a data buffer of the initiator to be transferred to the target. When the target is a printer, by way of example, the transferred data is printed by a printer engine.

Figure 5:
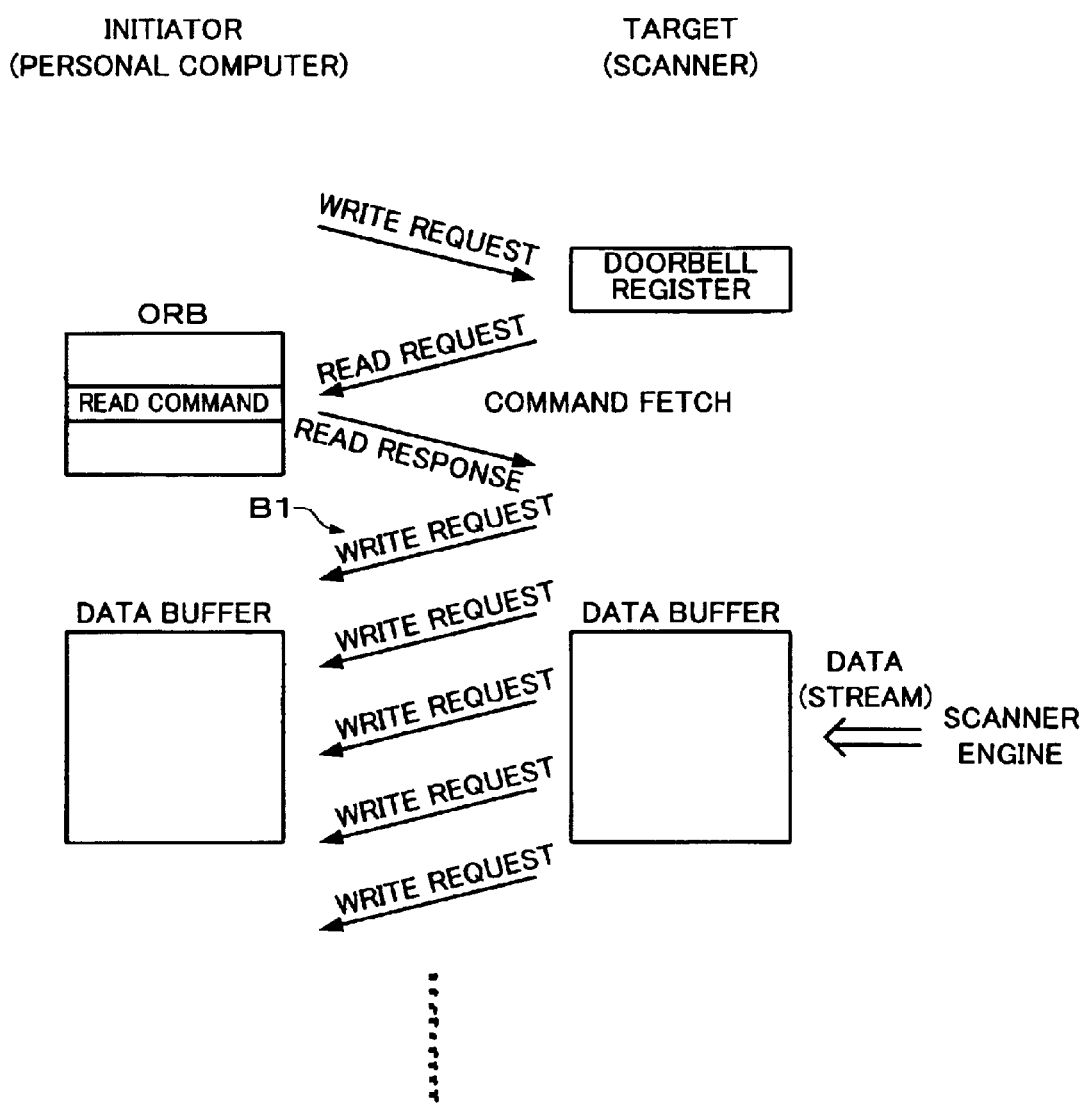
FIG. 5 illustrates command processing when data is transferred from a target to an initiator.

When a command comprised within the ORB is a SCSI read command, on the other hand, the target transmits a series of write request packets to the initiator, as shown at B1 in FIG. 5. This causes the transfer of data to the data buffer of the initiator, where this data would be scan data obtained by a scanner engine when the target is a scanner, by way of example.

With this SBP-2, the target can transmit a request packet (execute a transaction) and send or receive data when its own circumstances allow. Since it is therefore not necessary for the initiator and the target to operate in synchronism, the efficiency of data transfer can be increased.

Note that protocols other than SBP-2 are also being proposed as protocols of a higher order than IEEE 1394, such as the function control protocol (FCP).

When data is to be transferred to/from the initiator, the sequence depends on whether a page table exists in a data buffer (storage means) at the initiator (another node), as shown in FIG. 6A, or whether no such table exists.

When a page table exists, the address of that page table and the number of elements therein is comprised within the ORB created by the initiator, as shown in FIG. 6B. The address of the transfer data (the read address or write address thereof) is specified as an indirect address using that page table.

When no such table exists, on the other hand, an address and data length are comprised within the ORB, as shown in FIG. 6C, so that the address of the transfer data is specified as a direct address.

1.4 Bus Reset

Under the IEEE 1394, a bus reset occurs when power is applied or devices have been disconnected or connected while power is on. In other words, each node monitors the voltage state at the corresponding port. If a voltage change occurs at a port because of the connection of a new node to the bus, for example, a node that has detected that change informs the other nodes on the bus that a bus reset has occurred. The physical layer of each node informs the link layer that a bus reset has occurred.

When such a bus reset occurs, topology information such as node IDs is cleared then this topology information is automatically reset. In other words, tree identification and self identification are performed after a bus reset. The nodes that are to act as management nodes, such as the isochronous resource manager, cycle master, and bus manager are then determined. Ordinary packet transfer restarts.

Since the topology information is automatically reset under this IEEE 1394, it is possible to implement a hot-plug configuration in which the cables of electronic equipment can be freely removed or inserted.

Note that if a bus reset occurs during a transaction, that transaction is cancelled. The request node that issued the canceled transaction transfers the request packet again, after the topology information has been reset. The responding node does not return a response packet to the request node for a transaction that has been canceled by a bus reset.

2. Overall Configuration

The overall configuration of a data transfer control device in accordance with this embodiment of the invention is described below, with reference to FIG. 7. Note that the description below relates to an example in which the target for data transfer to/from the initiator is a printer, but the present invention is not limited thereto.

A data transfer control device 10 in accordance with this embodiment of the invention comprises a PHY device 12 (a physical-layer device), a link device 14 (a link-layer device), a CPU 16 (a processor), a data buffer 18 (storage means), and firmware 20 (processing means). Note that the PHY device 12, the link device 14, the CPU 16, and the data buffer 18 are arbitrary structural components and it is not necessary for the data transfer control device 10 of this embodiment of the invention to have all of these structural components.

The PHY device 12 is circuitry for implementing the protocol of the physical layer of FIG. 1 in a hardware manner, and has the function of converting the logical symbols used by the link device 14 into electrical signals.

The link device 14 is circuitry for implementing the protocol of the link layer of FIG. 1 and part of the protocol of the transaction layer in a hardware manner, and provides various services relating to packet transfer between nodes.

The CPU 16 controls the entire device and also controls data transfer.

The data buffer 18 is a buffer for storing transfer data (packets) temporarily and is configured of hardware such as SRAM, SDRAM, or DRAM. Note that the data buffer 18 in accordance with this embodiment of the invention functions as randomly accessible packet storage means.

The firmware 20 is a program that comprises various processing routine (processing modules) that operate in the CPU 16, and the transaction-layer protocol is implemented by this firmware 20 and the CPU 16 which is hardware.

Note that a device driver 102 comprised within a personal computer 100 that is the initiator is a program that comprises various processing routines for managing and controlling peripheral equipment. Such a program is installed in the personal computer 100 by using an information storage medium 110 (floppy disk, CD-ROM, DVD, or ROM).

In such a case the device driver 102 program could be downloaded over a network such as the Internet from an information storage medium (such as a hard disk or magnetic tape) of a host system, then installed in the personal computer 100. The use of an information storage medium located in a host system in this manner is also covered by the present invention.

The firmware (F/W) 20 comprises a communications section (COM) 30, a management section (MNG) 40, a print task section (PRT) 50, and a fetch section (FCH) 60.

In this case, the communications section 30 is a processing module that functions as an interface with other hardware such as the link device 14.

The management section 40 (management agent) is a processing module for managing functions such as logging in, reconnecting, logging out, and reset. If an initiator has requested a target to log-in, for example, the management section 40 first receives that log-in request.

The print task section 50 is a processing module that handles data transfer processing to and from a printer engine that is the final-stage application layer (upper layer).

The fetch section 60 (fetch agent or command block agent) is a processing module for executing commands that comprise command block ORBs. The fetch section 60 differs from the management section 40 which can handle only one request at a time in that it can handle an ORB link list that has been fetched by its own request from the initiator.

The fetch section 60 comprises a determination section 62, a command storage section 64, a command comparison section 66, an address storage section 68, an address comparison section 70, and a data transfer restart section 72.

In this case, the determination section 62 performs processing to determine whether or not a bus reset (broadly speaking: a reset that clears node topology information) has occurred during a data transfer period for the transfer of data to/from the initiator (another node).

The command storage section 64 performs processing to store the content of an ORB (a command block ORB: broadly speaking, a command packet for a data transfer operation request) that was transferred from the initiator before the bus reset occurred, at the point at which the bus rest occurred or the point at which reconnection succeeds.

The command comparison section 66 performs processing to compare the content of an ORB (command block ORB) that was transferred in from the initiator before the bus reset occurred (the content stored by the command storage section 64) and the content of an ORB that was transferred in from the initiator after the bus reset occurred.

The address storage section 68 performs processing to store the start address (first address) of transfer data (print data) to be transferred to/from the initiator.

The address comparison section 70 performs processing when a bus reset has occurred, to compare the start address (first address) stored by the address storage section 68 and the start address (second address) of transfer data that appears after the bus reset occurred.

When it is determined that a bus reset has occurred during a data transfer period and also when it is determined that the content of the ORBs (command block ORBs) match, the data transfer restart section 72 performs processing to restart the data transfer as a resumption of data transfer at the point at which the bus reset occurred (the next data after the transfer data at which the bus reset occurred).

3. Outline of Processing

The description now turns to an outline of the processing performed by this embodiment of the invention.

Figure 8:
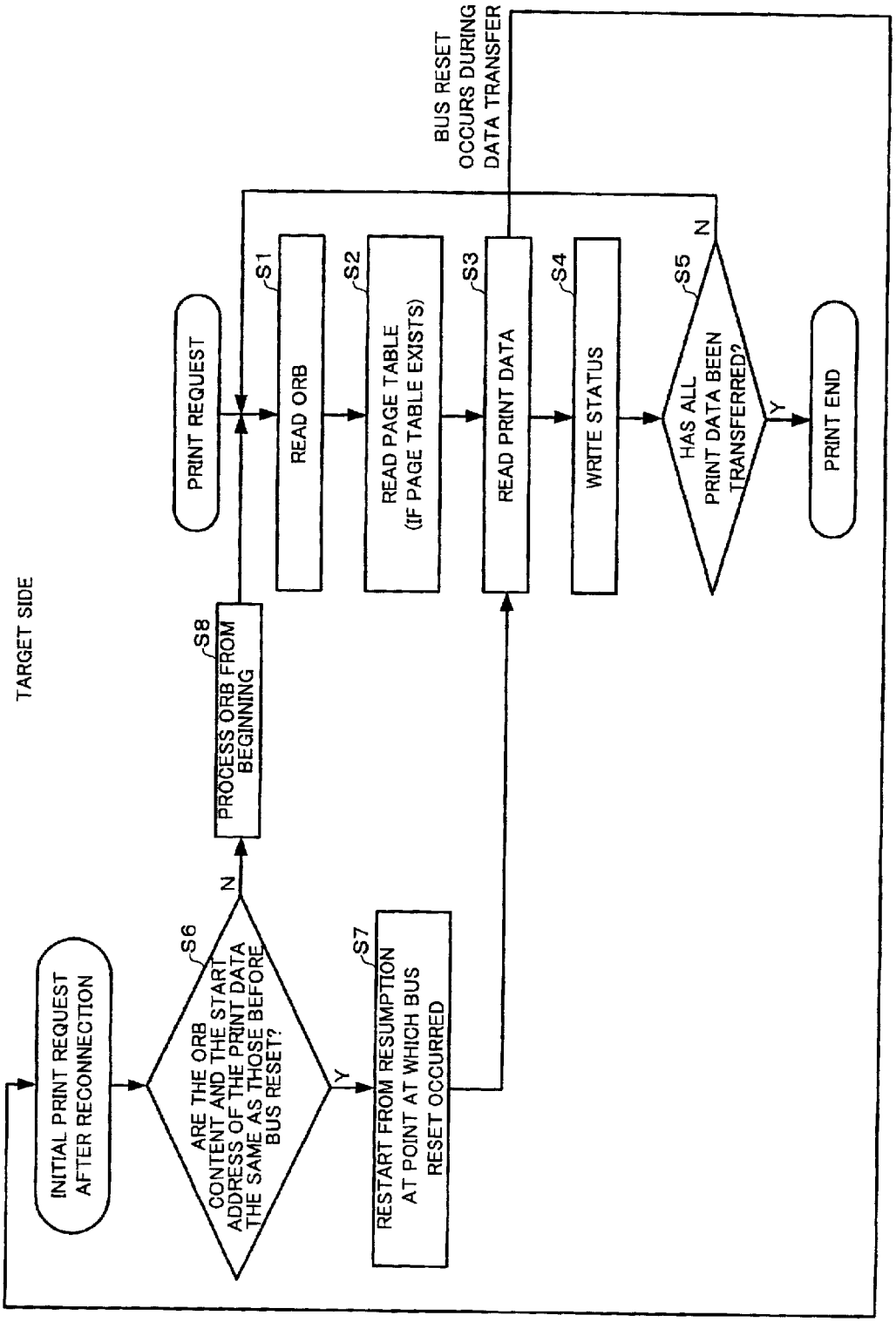
FIG. 8 is a flowchart of the basic processing on the target side (firmware).

A flowchart of the basic outline of the processing performed on the target side (firmware) is shown in FIG. 8.

When there is a print request from the initiator, the target reads the ORB from the data buffer of the initiator (step S1).

When there is a page table, the page table is read from the data buffer of the initiator, based on the page table address comprised within the ORB (see FIG. 6B) (step S2). The print data is read from the data buffer of the initiator, based on the read-out page table (step S3). Once all of the print data specified by the page table has been read, the target writes the status and passes the status of whether or not the data transfer was a success to the initiator (step S4). The above processing is repeated until all of the print data has been transferred (step S5).

If a bus reset occurs during the transfer of print data (the data transfer period) in accordance with this embodiment of the present invention, the processing described below is performed when the first print request occurs after reconnection.

First of all, the target determines whether or not the ORB content and the start address of the print data before the bus reset are the same as the ORB content and the start address of the print data after the bus reset (step S6). When they are determined to be the same, data transfer restarts from a resumption at the point at which the bus reset occurred (step S7). When they are determined to not be the same, on the other hand, processing starts from the beginning using the ORB after the bus reset as the initial ORB (step S8).

Figure 9:
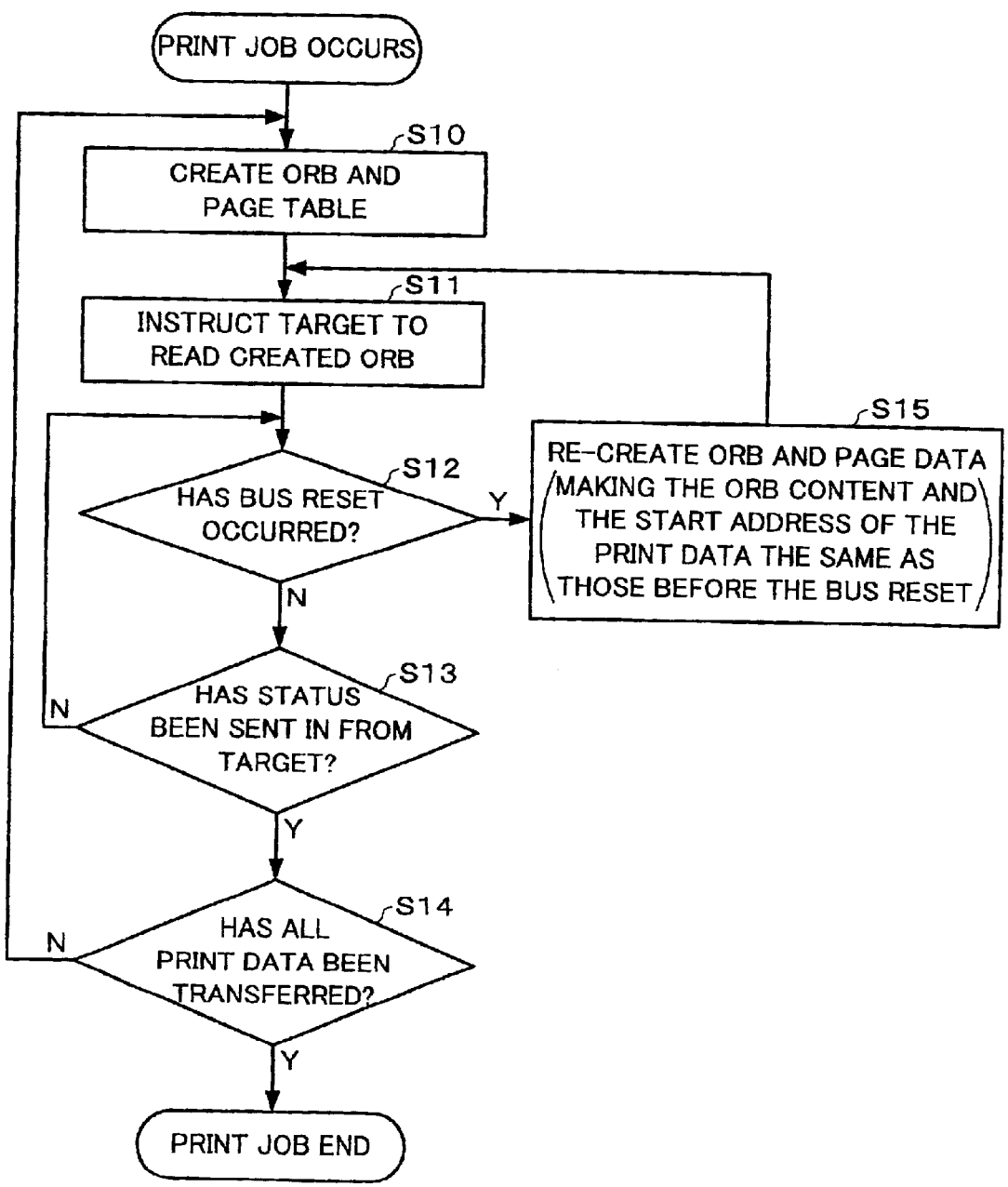
FIG. 9 is a flowchart of the basic processing on the initiator side (device driver).

A flowchart of the basic outline of the processing performed on the initiator side (device driver) is shown in FIG. 9.

When a print job from an application program occurs, the initiator creates an ORB and a page table for the printing and writes them to the data buffer (step S10). The target is then instructed to read the created ORB (step S11, see A1 in FIG. 4).

The initiator then determines whether or not a bus reset has occurred and, if no bus reset has occurred, it determines whether or not a status has come in from the target (step S13). When the status has been sent in, it then determines whether or not all of the print data has been transferred (step S14) and, when it has not been transferred, it returns to step S10. When the data has been transferred, it completes the print job.

With this embodiment of the present invention, when it determined in step S12 that a bus reset has occurred, the initiator re-creates the ORB and page table (step S15) and instructs the target to read that re-created ORB (step S11). In such a case, the initiator (device driver) re-creates the ORB in such a manner that the content of the ORB and the start address of the print data after the bus reset occurred are the same as the content of the ORB and the start address of the print data before the bus reset occurred.

4. Characteristics of this Embodiment

It has become clear that the problem described below will occur when a bus reset occurs during the transfer of print data.

Figure 10A:
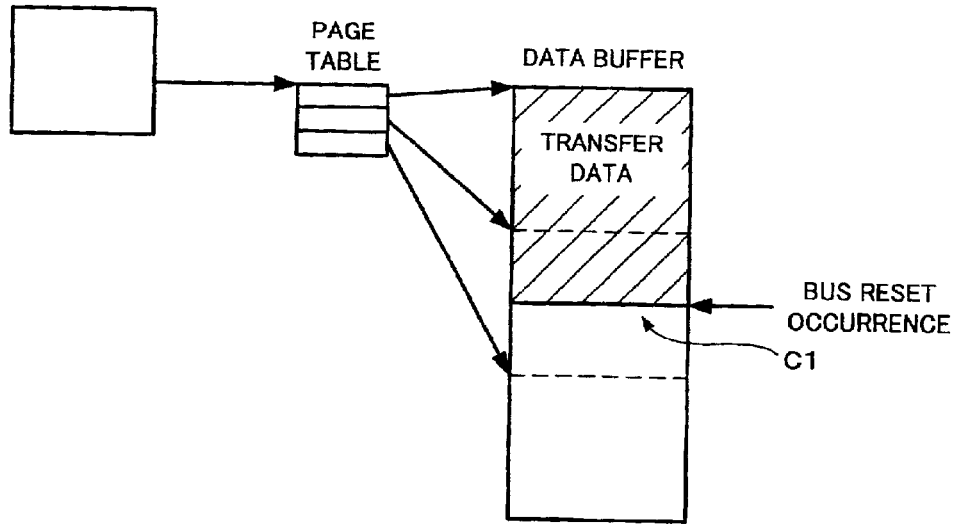
FIGS. 10A, 10B, and 10C are illustrative of the problem of duplicate printing.
Figure 10B:
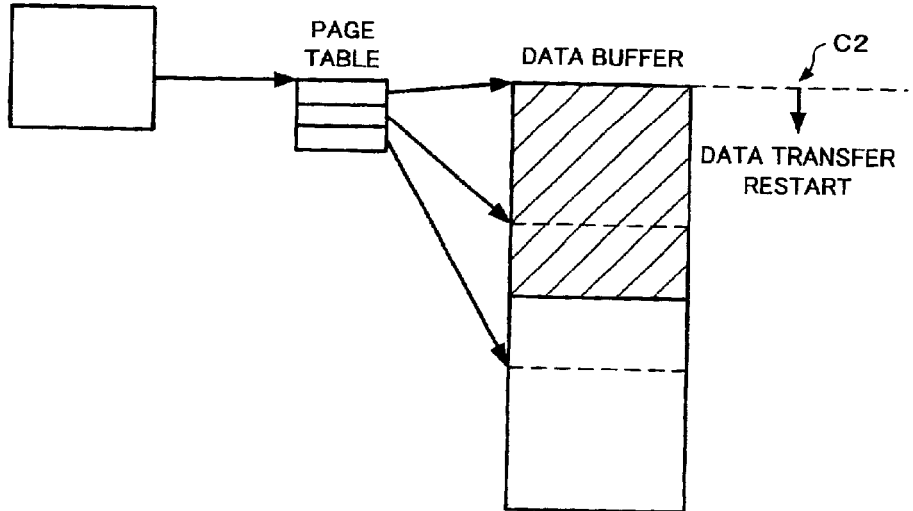
Figure 10C:
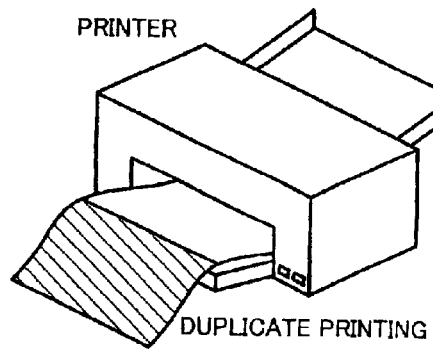

Assume that a bus reset has occurred when data has been transferred up to the position (address) indicated by C1 in FIG. 10, by way of example. In such a case, all transactions that were being processed at the point at which the bus reset occurred are canceled. The initiator that had requested the transfer of print data before the bus reset therefore re-creates an ORB for printing after the bus reset, as shown in FIG. 10B, to indicate to the target that the transfer of print data is to restart from the beginning. For that reason, the data transfer will restart from the position indicated by C2 in FIG. 10B, so that part of the print data will be sent twice. As a result, the problem of duplicate printing will occur, as shown in FIG. 10C.

In order to solve this problem, this embodiment of the present invention employs the method described below.

Figure 11:
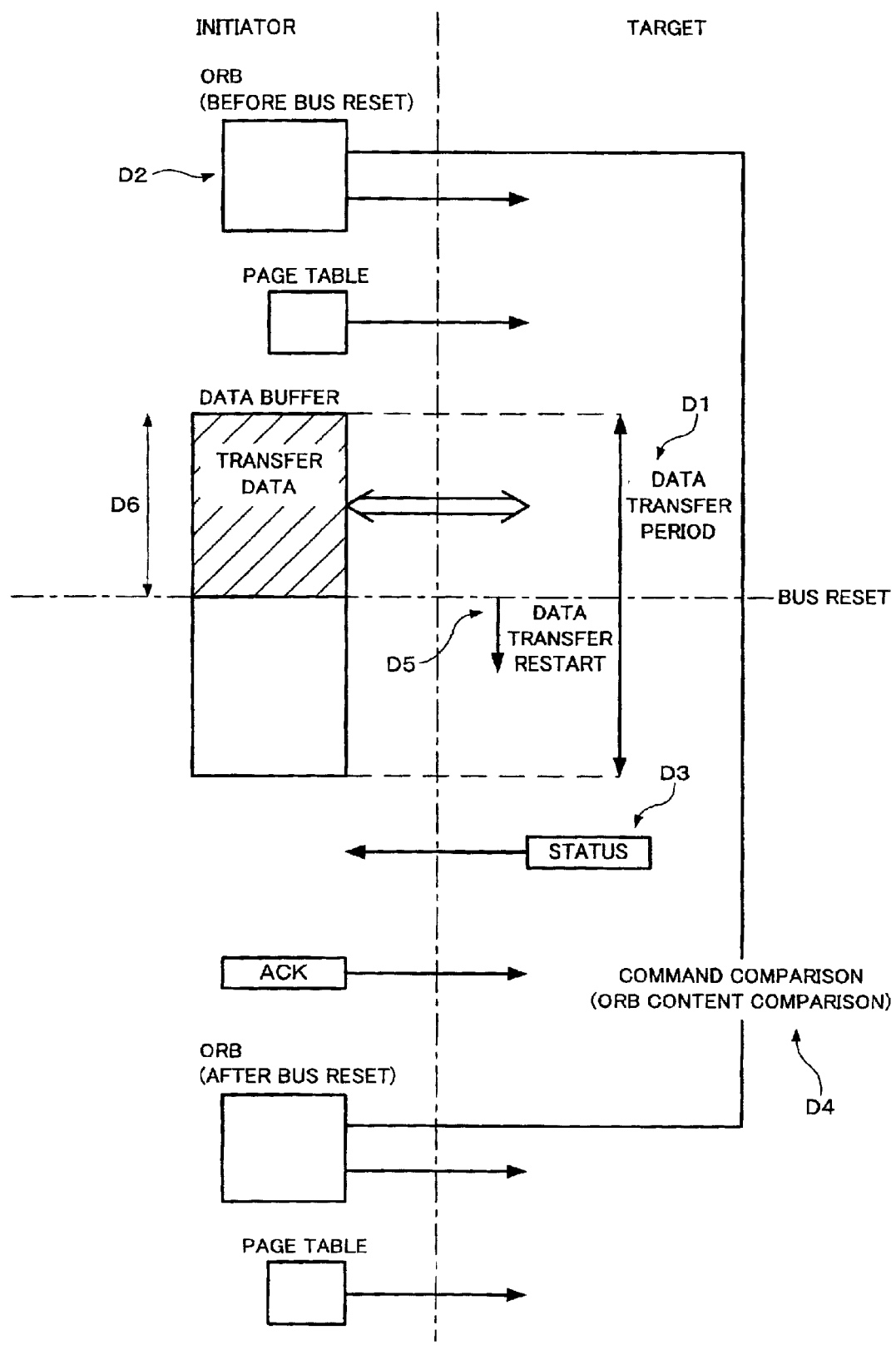
FIG. 11 is illustrative of a method by which data transfer is restarted in continuation if a bus transfer has occurred during the data transfer period and the content of the ORBs before and after the bus reset is the same.

The device in accordance with this embodiment of the invention first determines whether or not a bus reset has occurred within the data transfer period (the period from the start of the transfer of print data to/from the initiator, up until the completion thereof), as shown at D1 in FIG. 11. More specifically, the system determines that a bus reset has occurred during a data transfer period if the ORB (command block ORB) shown at D2 is being processed at the point at which the bus reset occurs and also the data transfer specified by that ORB is already being processed, but the data transfer completion status shown at D3 has not been transferred to the initiator.

If the initiator reconnects successfully after the bus reset, then creates a new ORB and sends it in as a transfer request, the system in accordance with this embodiment of the invention compares the content of the ORB before the bus reset (first command packet) with the content of the ORB after the bus reset (second command packet), as shown at D4 in FIG. 11.

When it is determined that a bus reset has occurred during a data transfer period and if it is also determined that the content of the ORB before the bus reset is the same as the content of the ORB after the bus reset, data transfer restarts from a resumption of the data transfer that was being done at the point at which the bus reset occurred, as shown at D5 (see step S7 of FIG. 8). In other words, the data transfer restarts from the data after the data whose transfer had already been completed at the point at which the bus reset occurred.

If no bus reset has occurred during a data transfer period, or if the content of the ORBs before and after a bus reset is not the same, on the other hand, processing starts from the beginning with each ORB after the reset being handled as a new ORB (step S8 in FIG. 8).

The above described method ensures that there is no duplicate transfer of the portion of data shown at D6 in FIG. 11, unlike the case shown in FIG. 10B. There is therefore no chance of erroneous printing such as that shown in FIG. 10C. Since duplicate transfer can thus be avoided, the transfer time can also be shortened.

If a bus reset occurs in any period other than a data transfer period, by way of example, transfer data is not duplicated even if the data does not restart as a resumption at the point at which the bus reset occurred, as shown at D5, so there is no problem. In addition, if a bus reset has occurred in a period other than a data transfer period, the processing of each ORB from the beginning is simpler than the restart processing of data transfer, thus easing the processing load.

Another, different, method that could be considered is one in which data transfer always restarts from a resumption at the point at which the bus reset occurred, without any comparison of the content of ORBs.

If such a method is used, however, an inconvenience would occur in that data transfer would restart from D5 in FIG. 11, even when the initiator has canceled the transfer of print data after a bus reset and has created an ORB that is completely different from the one created before the bus reset.

In contrast thereto, this embodiment of the present invention either restarts the data transfer from D5 in FIG. 11 if the ORB content is the same before and after the bus reset, or processes the ORB as a completely new one if they are not the same, so there are none of the above described inconveniences.

Note that various types of information are compared during the comparison of ORB content in accordance with this embodiment of the present invention. For example, the system in accordance with this embodiment of the present invention could compare a page table existence flag P, data size, operation codes (codes identifying a print command or read command) within a command block (command set) field, and data length that are comprised within a command block ORB, as shown in FIG. 12. When each ORB also comprises identification information (such as a serial number) for identifying that ORB, this identification information is also compared. It is therefore possible to determine whether or not the ORBs before and after the reset are the same in a reliable manner, by simple processing that compares such information.

Figure 13:
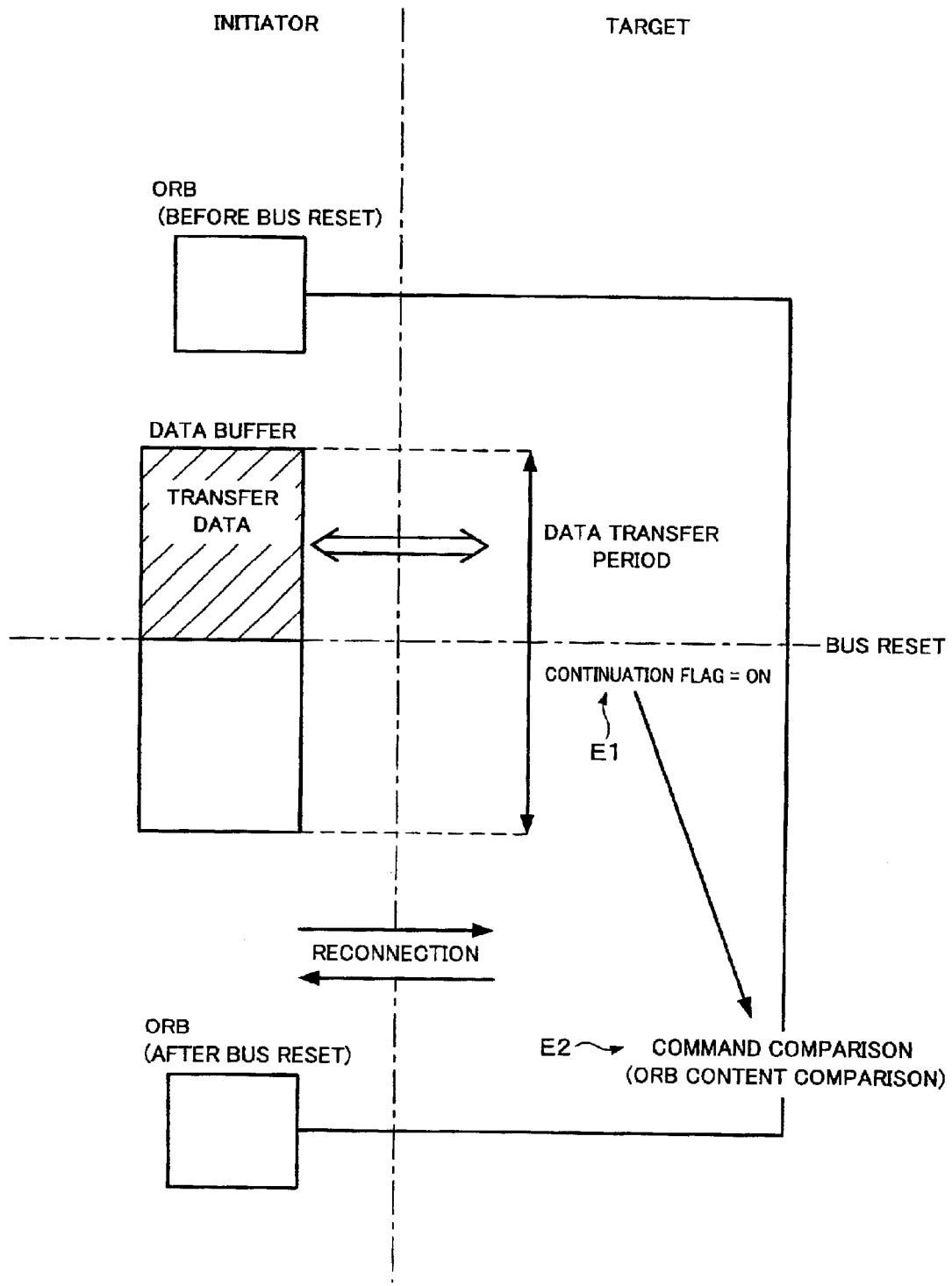
FIG. 13 is illustrative of the continuation flag.

With this embodiment of the present invention, the configuration is such that a continuation flag, which indicates that data transfer can restart in continuation, is set to on when it has been determined that a bus reset has occurred during the data transfer period, as shown at E1 in FIG. 13. If reconnection succeeds after the occurrence of a bus reset, for example, it is determined whether or not the bus reset occurred during a data transfer period and, if it is so determined, the continuation flag is set to on.

The comparison of the ORB content proceeds on condition that the continuation bit is on, as shown at E2 in FIG. 13. In other words, the ORB content is not compared when the continuation flag is off. This prevents any unnecessary ORB content comparison processing, thus enabling a reduction in the processing load on the firmware.

With this embodiment of the present invention, data such as information for specifying the address for the restart of data transfer (at D5 in FIG. 11) and the content of the ORB before the bus reset are stored at the point at which the bus reset occurred or the point at which reconnection succeeded (broadly speaking: after the bus reset, up until the data transfer restarts). Storing this information in this manner makes it simple to determine whether or not data transfer is to restart from the resumption at the point at which the bus reset occurred, when an ORB is re-transferred from the initiator after a bus reset. In addition, this configuration enables a simplification of the data transfer restart processing.

Note that the information described specifically below can be considered as information for specifying the address for the restart of data transfer.

Figure 14:
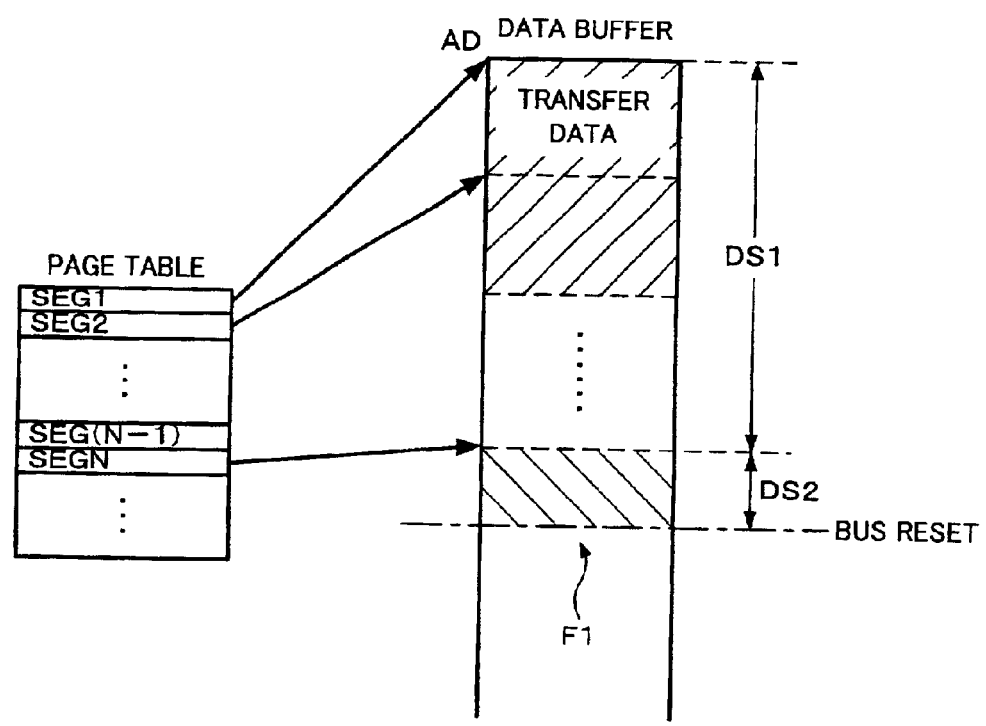
FIG. 14 is illustrative of information for specifying an address for the restart of data transfer.

Assume that the transfer data specified by a segment SEGN on the Nth page table was being transferred at the point at which the bus reset occurred, as shown in FIG. 14 by way of example. In such a case, the information for specifying the address for the restart of data transfer (the address shown at F1) could be the address stored in an initial segment SEG1 of the page table (the start address of the transfer data), the size DS1 of data transferred by segments SEG1 to SEG(N-1), the segment number of the segment N, or the size DS2 of the data that was transferred by the segment N up until the point at which the bus reset occurred.

Within the ORBs sent in by the initiator after the occurrence of the bus reset, an ORB (command block ORB) comprising the print command that was initially sent in is compared with an ORB which is transferred before the bus reset in accordance with this embodiment of the invention.

Figure 15:
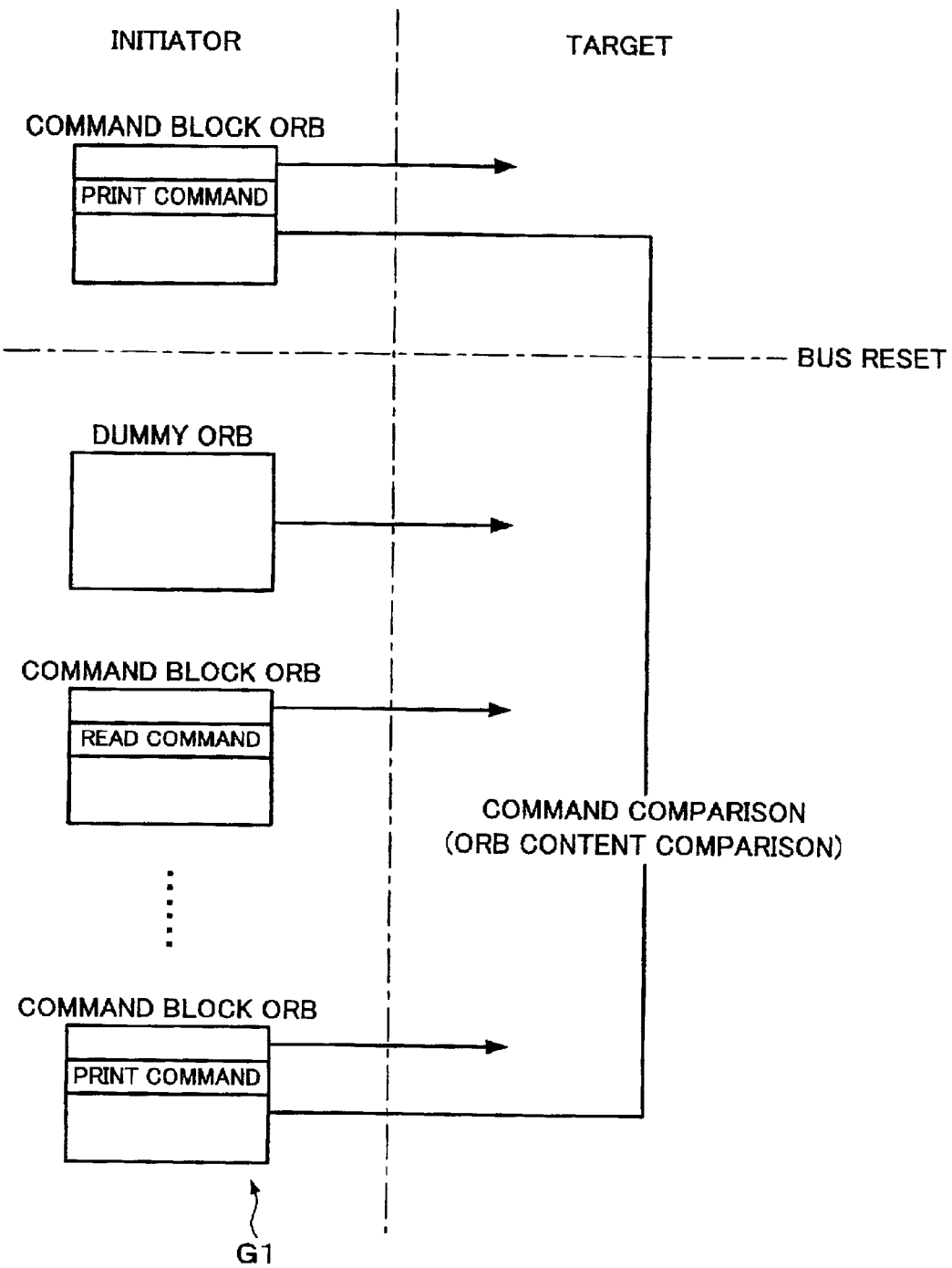

Note that this is not limited to a command block ORB that comprises a print command that is sent in immediately after a bus reset, as shown by way of example in FIG. 15. In other words, the initiator may send in a dummy ORB or management ORB as transfer requests before requesting the transfer of the command block ORB that comprises the print command. Alternatively, a request for the transfer of a command block ORB comprising a read command for checking the status of the printer might come in.

With this embodiment of the present invention, the content of ORBs is not compared if a dummy ORB or the like is sent in, but the ORB content comparison is done for the first time when a command block ORB comprising a print command is sent in, as shown at G1 in FIG. 15. In other words, the execution of ORB content comparison processing is deferred until the first command block ORB comprising a print command is sent in. This prevents unnecessary comparison of ORB content, thus enabling a reduction in the processing load on the firmware.

Figure 16:
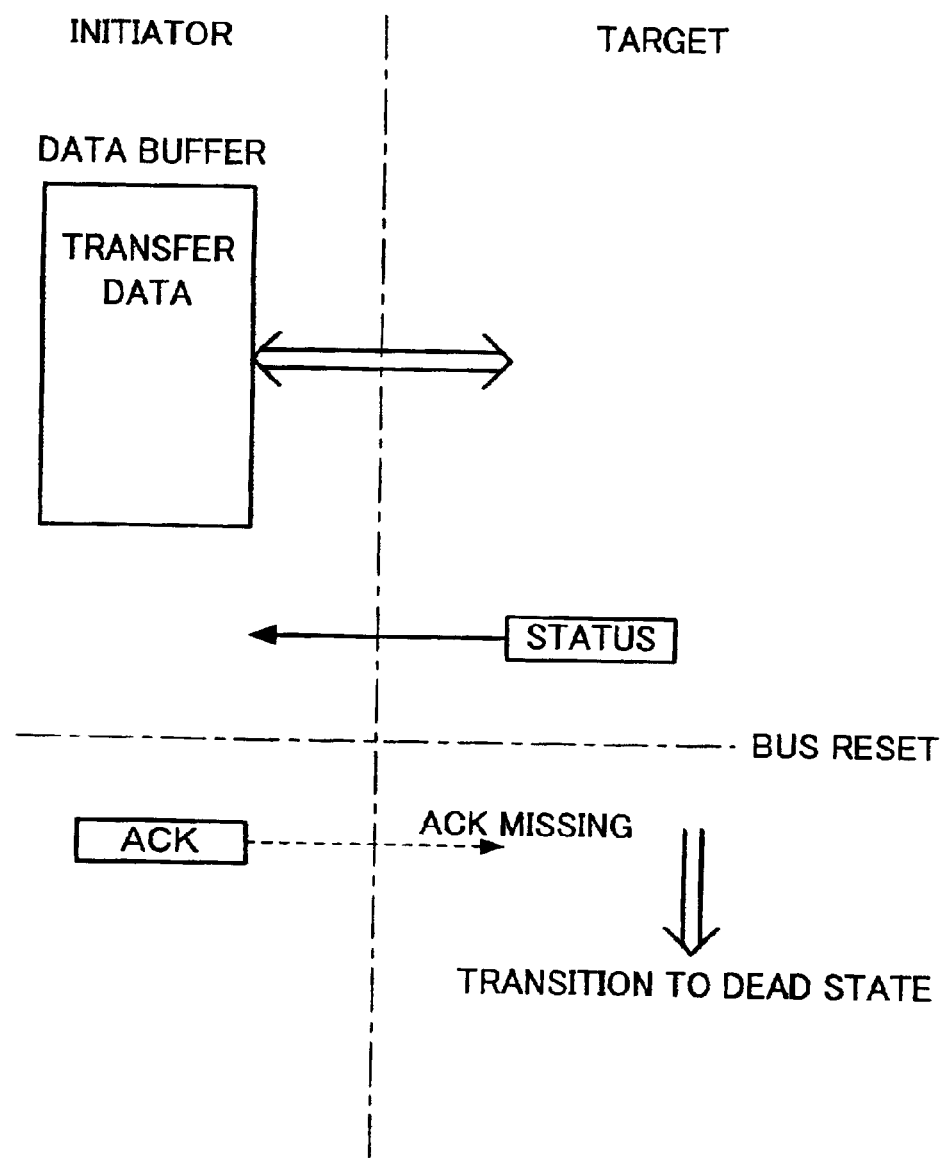
FIG. 16 is illustrative of a method of moving to a dead state if a bus reset occurs during the writing of the status, leading to an ACK missing state.

A bus reset can occur at any time whatsoever. This means that an ACK missing state may occur if the target has sent the data transfer completion status to the initiator but an ACK (ACK complete) reply has not arrived from the initiator because of a bus reset, as shown in FIG. 16 by way of example.

If this happens, two cases can be considered: a first case in which ACK missing has occurred because the bus reset prevented the initiator from receiving the completion status, and a second case in which the initiator did receive the status and send an ACK in response, but the ACK went missing because of the bus reset.

In the first case, the initiator considers that the data transfer was unsuccessful and will perform a first processing of re-creating the same ORB after the bus reset. In the second case, on the other hand, the initiator has considered the data transfer to be successful and will perform a second processing of creating the next ORB after the bus reset.

Since the only information that reaches the target states that the ACK is missing, however, the target cannot learn which of the above described first and second processing the initiator is performing. When data transfer starts from a resumption at the point at which the bus reset occurred in such a case, it is possible that erroneous data transfer will occur.

When no acknowledgment is received from the initiator, because of a bus reset, the device in accordance with this embodiment of the present invention moves to a dead state (data transfer disabled state), as shown in FIG. 16. This makes it possible to prevent a situation in which erroneous data transfer occurs.

The above description mainly concerned a case in which the target is a printer, but further problems can occur when the target is a scanner, as described below.

A scanner has a problem in that, once the head has moved out, it is not possible to return the head and acquire (scan) the same data again.

Figure 17:
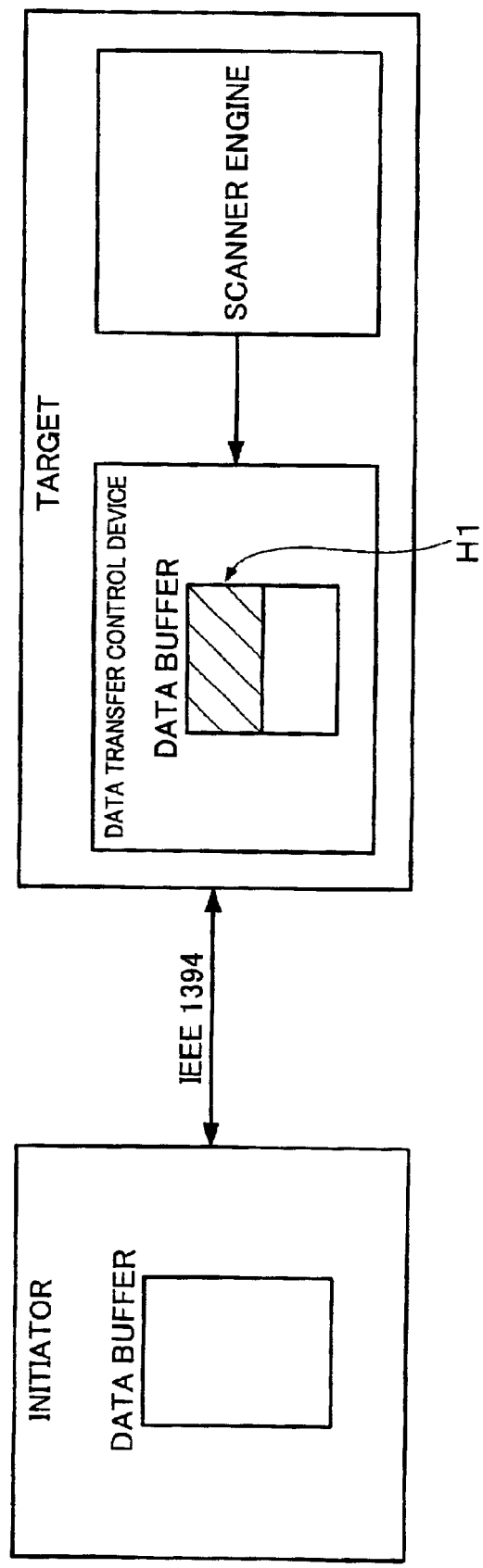
FIG. 17 is illustrative of a method of retaining data that had not yet been transferred to the initiator when a bus reset occurred, without destroying it.

In such a case, a device in accordance with this embodiment of the invention retains transfer data that had not yet been transferred to the initiator at the point at which the bus reset occurs, from among the transfer data from the scanner engine (broadly speaking: an upper-layer device), without destroying it, as shown in FIG. 17. In other words, data fetched from the scanner engine is stored in a data buffer, as shown at H1 in FIG. 17, but data that has not yet been transferred to the initiator over the IEEE 1394 bus is retained without destruction, by not clearing the data buffer.

This makes it possible to prevent the various inconveniences that can occur, such as the loss of image data that was f etched before the bus reset occurred, even if data transfer is restarted after the occurrence of a bus reset from a resumption at the point at which the bus reset occurred, using the method shown in FIG.

5. Detailed Processing Examples

The description now turns to detailed examples of the processing in accordance with this embodiment of the present invention, with reference to the flowcharts of FIGS. 18 to 22.

Figure 18:
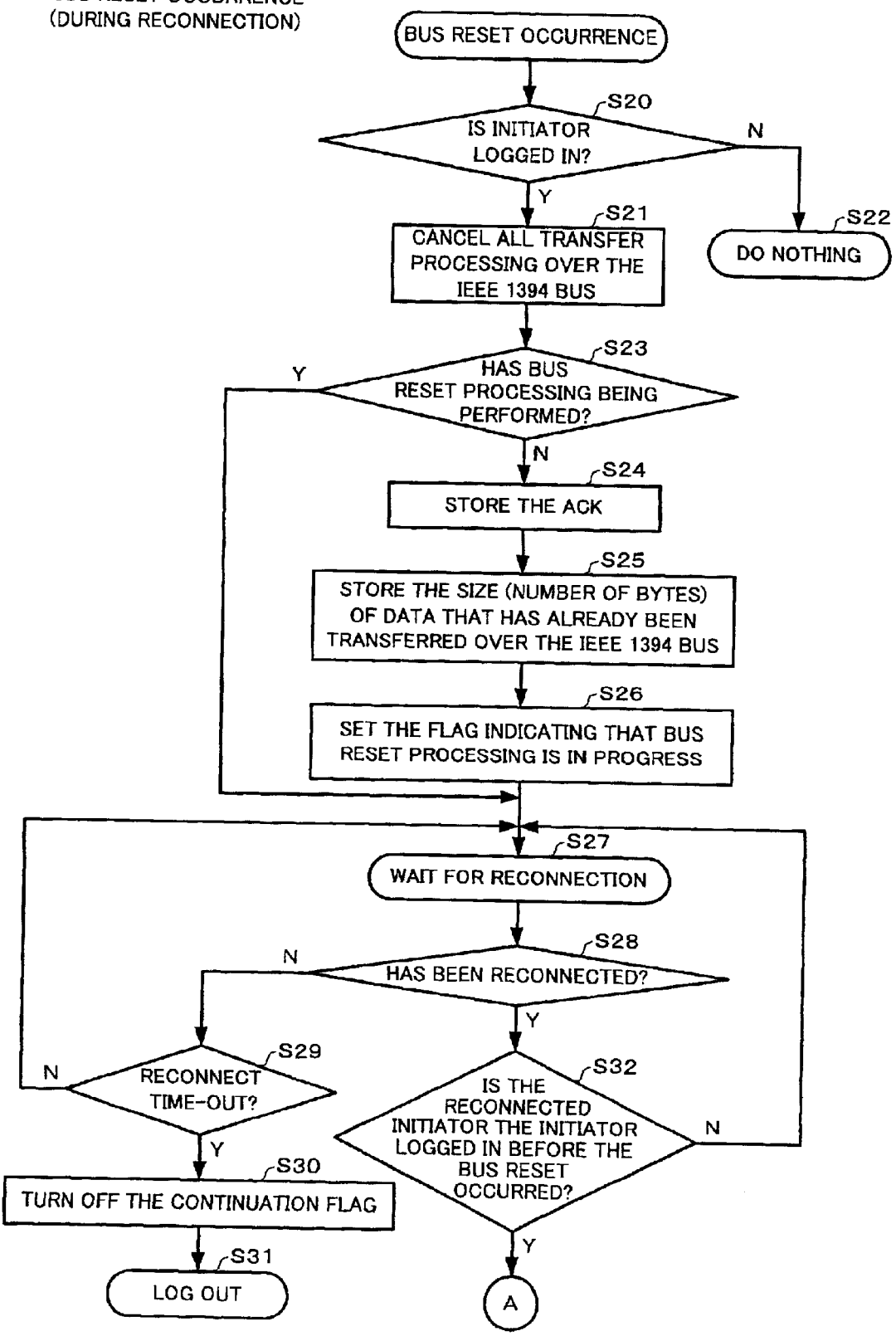
FIG. 18 is a flowchart of a detailed example of processing in accordance with this embodiment of the present invention when a bus reset occurs (when reconnection occurs).
Figure 19:
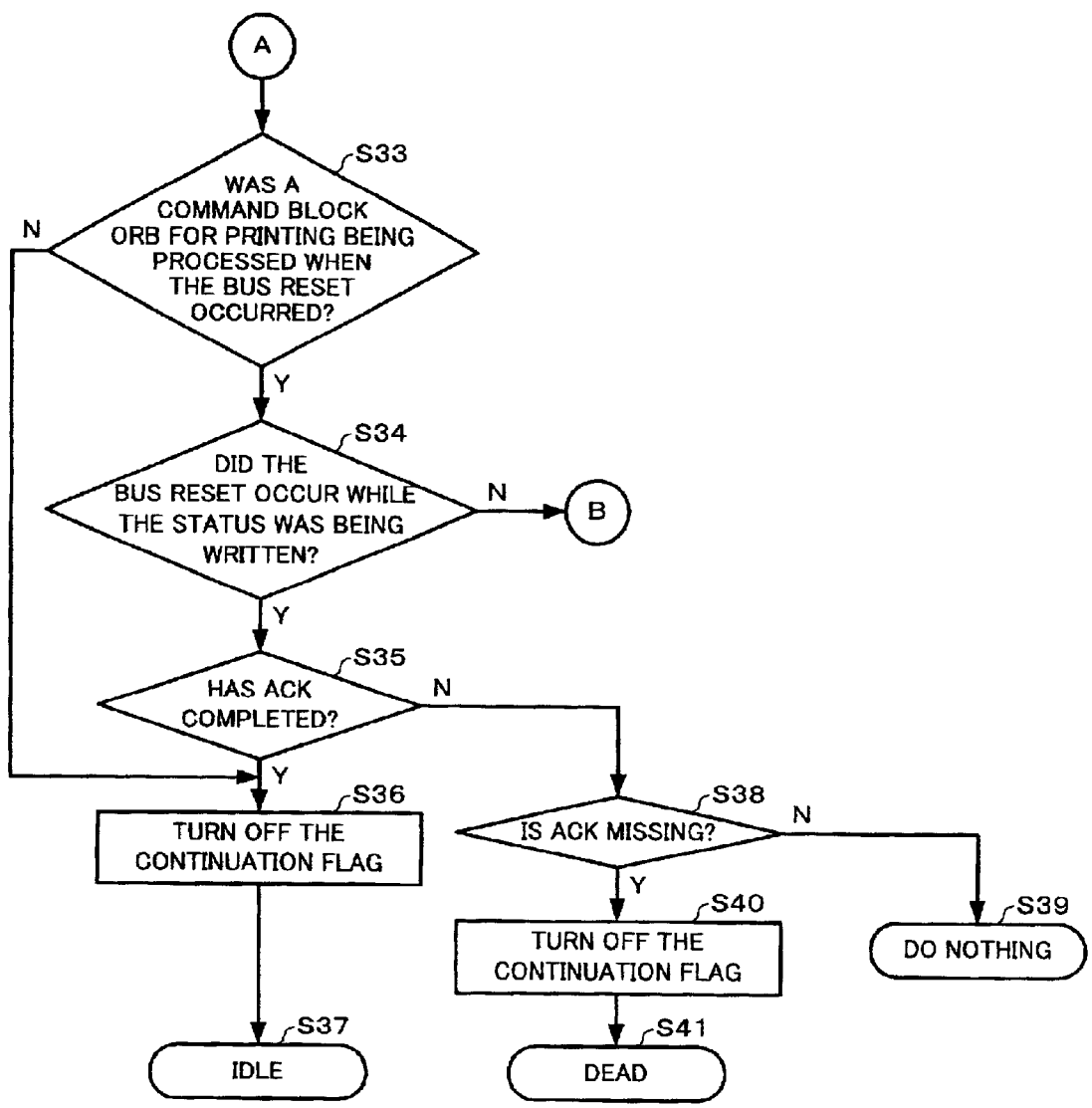
FIG. 19 is another flowchart of the detailed example of processing in accordance with this embodiment of the present invention when a bus reset occurs (when reconnection occurs).
Figure 20:
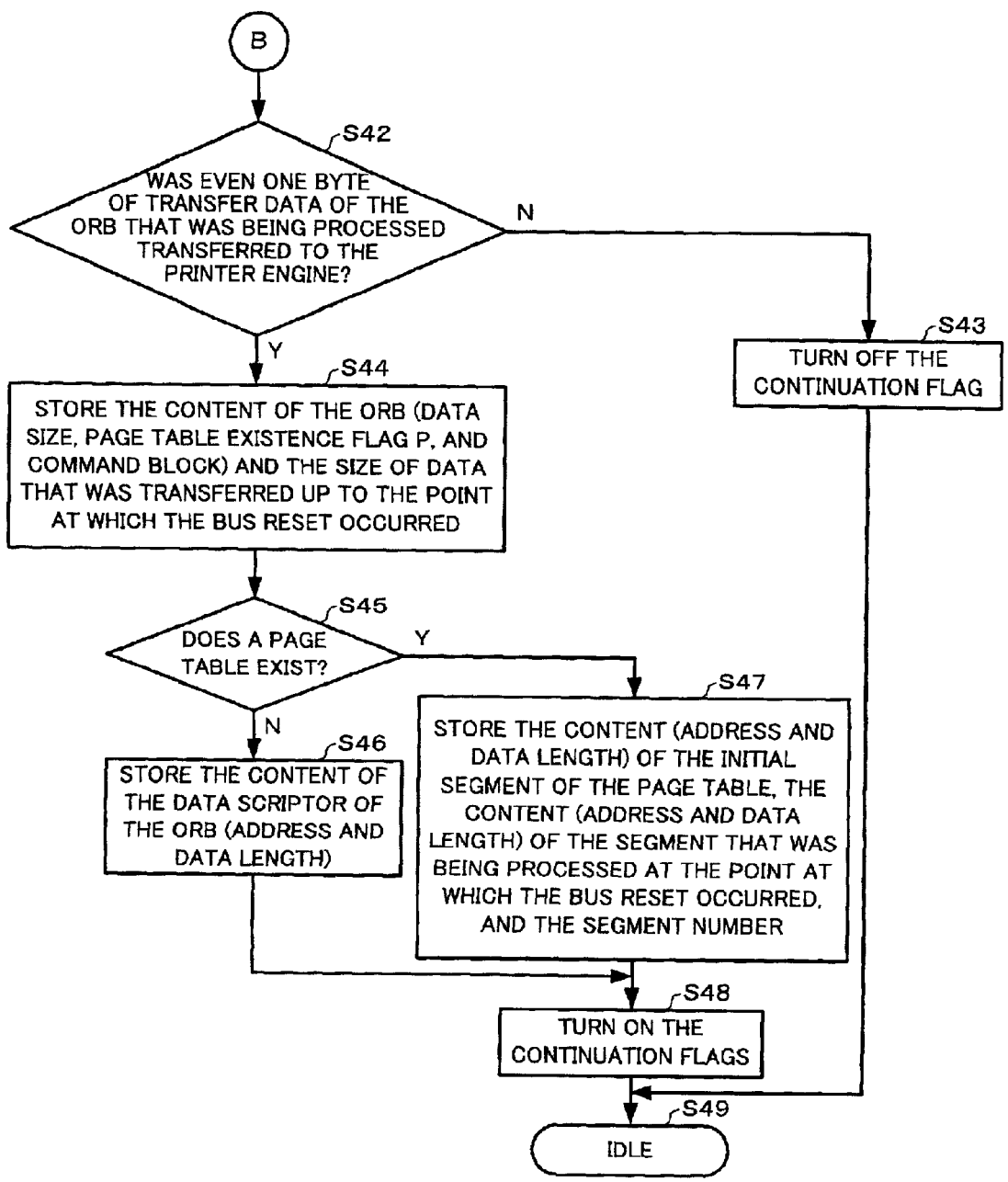
FIG. 20 is a further flowchart of the detailed example of processing in accordance with this embodiment of the present invention when a bus reset occurs (when reconnection occurs).

FIGS. 18 to 20 are flowcharts of an example of the processing done when a bus reset occurs (during a reconnection).

When a bus reset occurs, the target first determines whether or not the initiator is logged in (step S20), then, if it is logged in, it cancels all transfer processing (transactions) over the IEEE 1394 bus (step S21). When the initiator is not logged in, no particular processing is necessary, even though a bus reset occurred, so the target does nothing (step S22).

The system (target) then determines whether or not bus reset processing has already been performed (step S23). This makes it possible to prevent a situation in which the bus reset processing is repeated a number of times unnecessarily, when bus resets have occurred a number of times.

The system stores the state of the acknowledgment (ACK) at the point at which the bus reset occurred (step S24). This prevents a situation in which the ACK content immediately after a bus reset could be deleted by a subsequent transaction (such as a reconnection transaction).

The size of data (number of bytes) that have been transferred over the IEEE 1394 bus is then stored (step S25). In other words, the system stores the size of data that has been transferred for that segment that was being processed at the point at which the bus reset occurred (DS2 in FIG. 14). The flag indicating that bus reset processing is in progress is set to on, because of the determination of step S23 (step S26). In other words, if this flag is on, the processing of steps S24 to S26 is not performed even if another bus reset occurs.

Then the system waits for a reconnection from the initiator (step S27) and determines whether or not the reconnection from the initiator has occurred (step S28). If reconnection has not occurred, the system determines whether or not the reconnect time-out period specified in the reconnect field of the log-in ORB has expired (step S29). If it has expired, the system sets the continuation flag that was described with reference to FIG. 13 (the flag indicating the possibility of restart of the data transfer in continuation) to off (step S30) and the state proceeds to a log-out state (step S31).

If the reconnect occurs within the reconnect time-out period, on the other hand, the system determines whether the reconnected initiator was connected before the bus reset (step S32) and, if the initiator is different from the one that was logged in before the bus reset, it refuses the connection of that initiator and returns to the reconnect-waiting state.

When a log-in comes from the same initiator as the one that was connected before the bus reset, the system determines whether a command block ORB for printing (an ORB comprising a print command) was being processed at the point at which the bus reset occurred (step S33 in FIG. 19). If it was not being processed, the system sets the continuation flag to off (step S36) and a state transition to an idle state occurs (step S37).

When the command block ORB for printing was being processed, the system determines whether or not the bus reset occurred during the status write (the period from the writing of the status to the return of the ACK) (step S34). When the bus reset occurred during the status write, the system determines whether or not ACK has been completed, based on the ACK information stored in step S24 of FIG. 18 (step S35).

When the ACK is complete, the system turns off the continuation flag (step S36) and a state transition to the idle state occurs (step S37). When the ACK is not complete, on the other hand, the system determines whether or not the ACK missing state has occurred (step S38). When there is no ACK missing, nothing is done (step S39), but when ACK missing has occurred, the system sets the continuation flag to off (step S40) and a state transition to the dead state (data transfer disabled state) described with reference to FIG. 16 occurs (step S41).

When it is determined by step S34 that the occurrence of the bus reset was not during the status write, the system determines whether or not even one byte of transfer (print) data of the ORB that was being processed has been transferred to the next-stage printer engine (step S42). If no data has been transferred at all, the system turns off the continuation flag (step S43) and a state transition to the idle state occurs (step S49).

When even one byte of data has been transferred to the printer engine, on the other hand, the content of the ORB (data size, page table existence flag P, and command block) and the size of data that was transferred up to the point at which the bus reset occurred are stored (step S44).

This data size is equivalent to the total of the number of bytes of data that had already been transferred to the later-stage printer engine at the point at which the bus reset occurred, plus the number of bytes of transfer data that had already been transferred over the IEEE 1394 bus at the point at which the bus reset occurred, but were being transferred to the next-stage printer engine or were scheduled to be transferred. If a printer is used by way of example, this is equivalent to the number of bytes of data that the printer has already printed plus the number of bytes of data that were currently being printed or were scheduled to be printed.

The system then determines whether or not a page table exists (step S45) and, if it does not exist, it stores the content of the data scriptor of the ORB (step S46). In other words, if there is no page table, the address and data length of the transfer data for direct addressing are stored (see FIG. 6C).

If the page table does exist, on the other hand, the system stores the content (address and data length) of the initial segment of the page table, the content (address and data length) of the segment that was being processed at the point at which the bus reset occurred and segment number, as described with reference to FIG. 14 (step S47). It then sets the continuation flag to on as described with reference to FIG. 13 (step S48) and a state transition to the idle state occurs (step S49).

When the system in accordance with the thus-configured embodiment of the present invention determines that a bus reset has occurred during a data transfer period (steps S33 and S34 of FIG. 19 and step S42 of FIG. 20), the continuation flag goes on (step S48).

Figure 21:
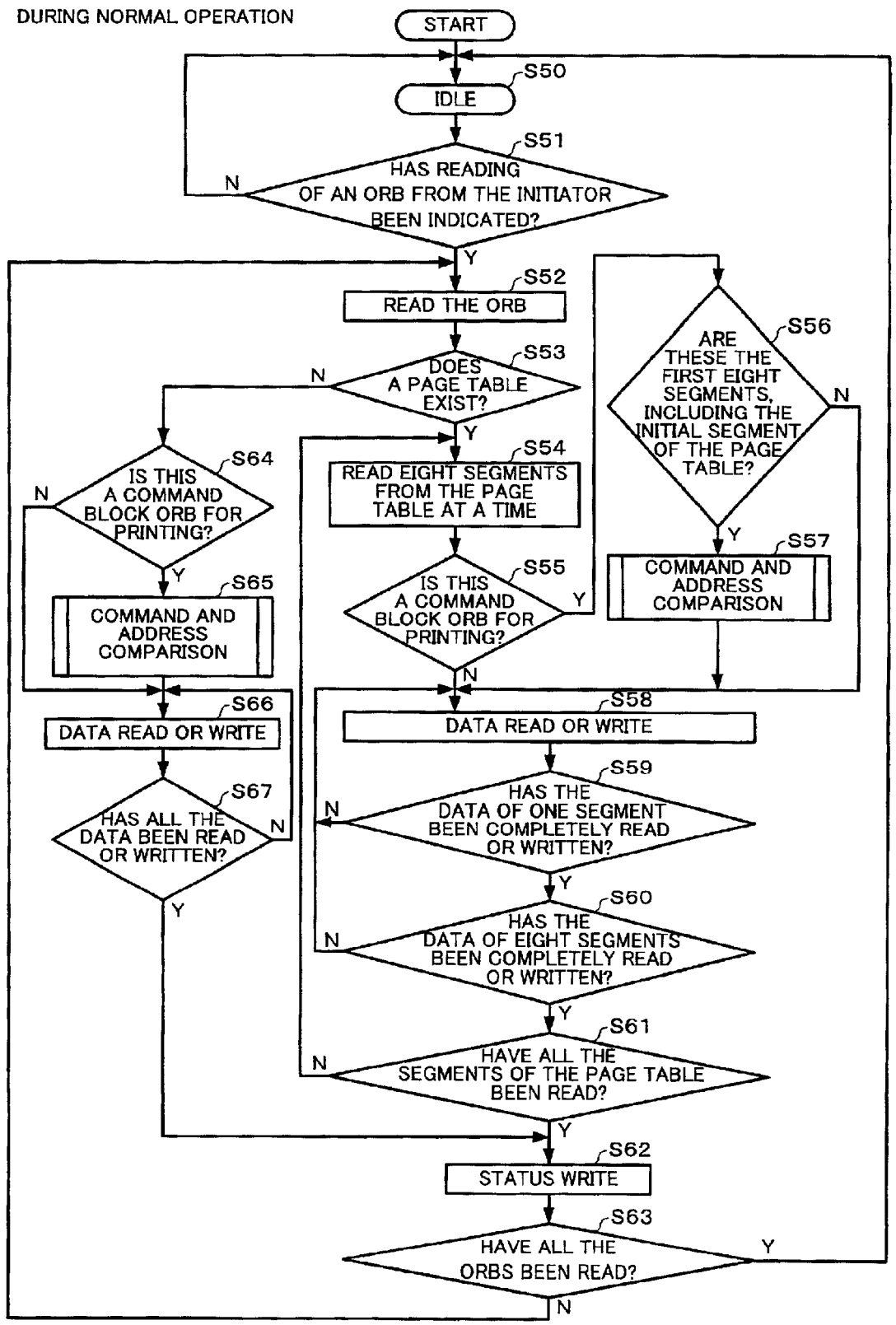
FIG. 21 is a flowchart of a detailed example of processing of this embodiment of the present invention during normal operation.
Figure 22:
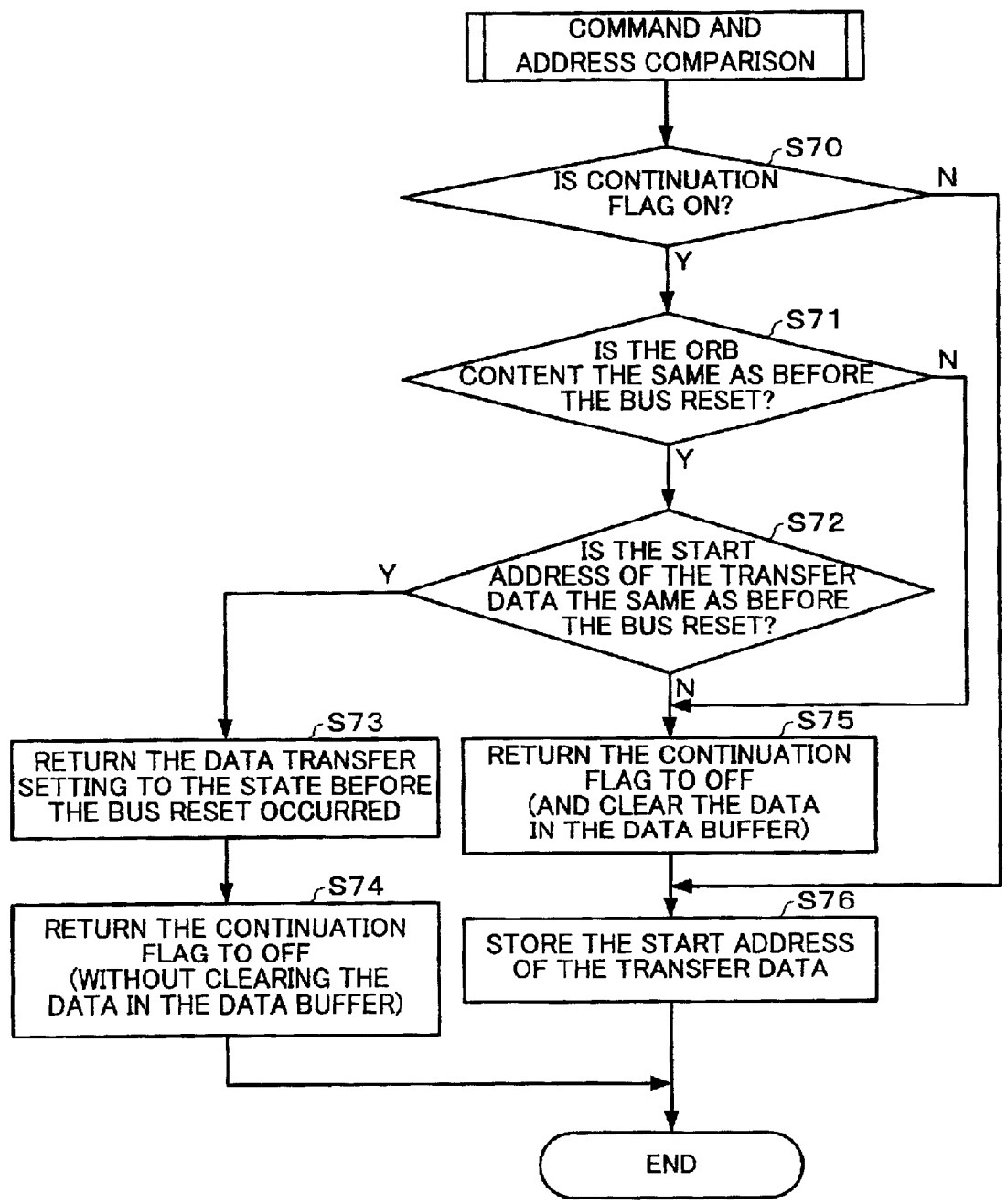
FIG. 22 is another flowchart of the detailed example of processing of this embodiment of the present invention during normal operation.

FIGS. 21 and 22 are flowcharts of an example of a detailed example of processing during normal operation.

First of all, the system (target) determines whether or not the reading of an ORB from the initiator has been indicated (whether or not the doorbell register has been ringed (step S51) and, when it is not indicated, it halts in the idle state (step S50). When is it so indicated, on the other hand, the ORB created by the initiator is read from the initiator (step S52). The system then determines whether or not there is a page table, based on the page table existence flag P comprised within the ORB (step S53). When a page table does exist, the system reads segments from the page table at a rate of eight segments at a time, by way of example (step S54).

The system then determines whether or not the read ORB is a command block ORB for printing, based on the operation code that is in the ORB command block, as described with reference to FIG. 15 (step S55). If it is a command block ORB for printing, the system determines whether or not the eight segments read by step S54 are the eight segments at the beginning of the page table (the eight segments including the initial segment) (step S56) and, if they are the beginning eight segments, the flow proceeds to the command address comparison processing shown in FIG. 22 (step S57).

If it is determined by step S55 that this is not a command block ORB for printing, and it is determined by step S56 that these are not the beginning eight segments, and it is also determined by step S57 that command address comparison processing has been completed, the data is read or written (step S58). The reading or writing of one segment of data is repeated until eight segments of data have been read or written (steps S59 and S60).

The system then determines whether all of the segments of the page table have been read (step S61) and, if all of the segments have not been read, it then reads the next eight segments of the page table (step S54). If all of the segments of the page table have been read, on the other hand, the system writes the status for the initiator (step S62). The system then determines whether or not all of the ORB for printing the document have been read (step S63) and the flow returns to step S52 if the next ORB is available or a state transition to the idle state occurs if there are no more ORBs (step S50).

If it is determined by step S53 that there is no page table, the system then determines whether or not the read ORB is a command block ORB for printing (step S64). If it is a command block ORB for printing, the flow proceeds to the command address comparison processing shown in FIG. 22 (step S65).

If it is determined that this is not a command block ORB for printing and command address comparison processing has been completed, on the other hand, the data is read or written (step S66) and this is repeated until all of the data has been read or written (step S67). When all of the data has been read or written, the flow proceeds to step S62 to write the status to the initiator.

During the command address comparison processing of FIG. 22, the system determines whether or not the continuation flag is on (step S70). This continuation flag is the flag that is set to on in step S48 of FIG. 20. When this continuation flag is off, the flow proceeds to step S76 in which the start address of the transfer data (the address of the initial segment of the page table) is stored and command address comparison ends.

When the continuation flag is on, the system determines whether or not the content of the read ORB is the same as the content of the ORB before the bus reset, as described with reference to FIGS. 11 and 12 (step S71). In that case, the content of the pre-bus-reset ORB that is compared is that were stored in step S44 of FIG. 20. In this embodiment of the invention, the comparison of the ORB content (step S71) is done before the comparison of the addresses (step S72).

When the ORB content is the same as that before the bus reset, the system determines whether or not the start address of the transfer data is the same as that before the bus reset (step S72). When they are the same, the data transfer setting is returned to the state before the bus reset occurred (step S73), in other words, the data transfer setting is returned to the state it was in before the bus reset, so that data transfer can restart at the position indicated by D5 in FIG. 11 (resumption at the point at which the bus reset occurred), based on factors such as the size of data stored in step S44 of FIG. 20 that had been transferred up to the point at which the bus reset occurred and the segment content and segment number stored in step S47. The continuation flag is then returned to the off setting (step S74). In this case, the configuration is such that the data in the data buffer of the target is not cleared, to ensure that there is no loss in the data that had already been transferred before the bus reset, as described with reference to FIG. 17.

Note that as in step S76, the start address of the transfer data is not stored after step S47, because the start address that was stored before the bus reset occurred can be used without change when data transfer restarts from the resumption at the point at which the bus reset occurred.

When it is determined by step S71 that the ORB content is not the same as that before the bus reset, or when it is determined in step 72 that the start address is not the same as that before the bus reset, the system returns the continuation flag to off and also stores the start address for the data transfer (steps S75 and S76), without performing data transfer restart processing. In other words, the read ORB is processed as a completely new ORB in such a case.

Note that since read ORB is processed from the beginning with step S75, the data buffer of the target is cleared, unlike in step S74.

6. Electronic Equipment

The description now turns to examples of electronic equipment comprising the data transfer control device of this embodiment of the invention.

Figure 23A:
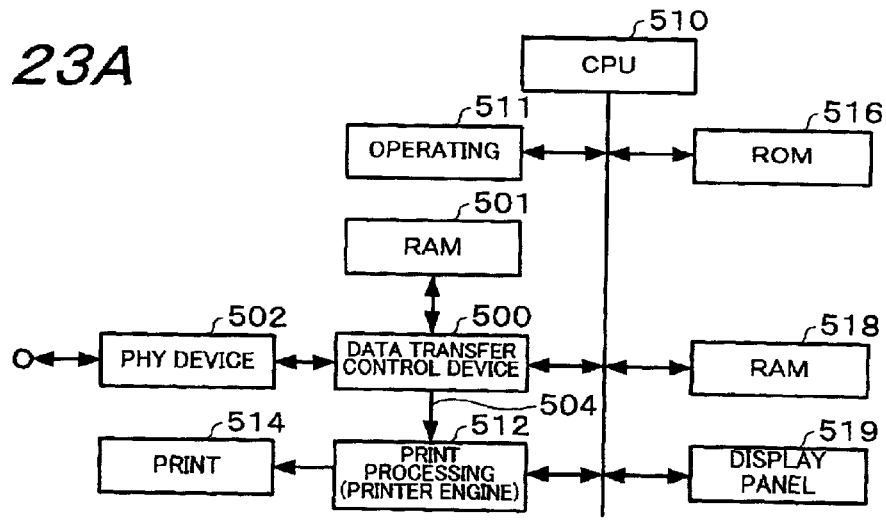
FIGS. 23A, 23B, and 23C show examples of the internal block diagrams of various items of electronic equipment.
Figure 24A:
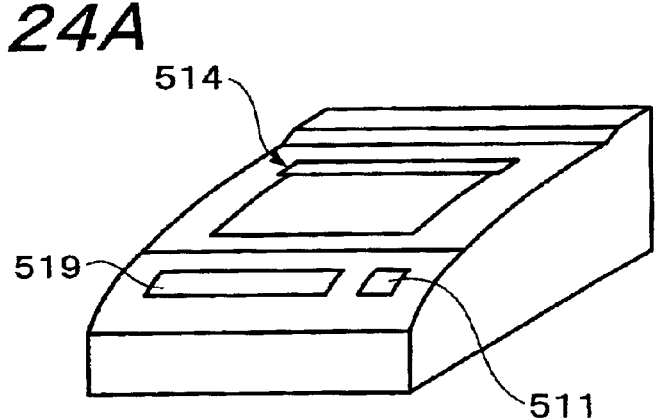
FIGS. 24A, 24B, and 24C show external views of various items of electronic equipment.

An internal block diagram of a printer that is one example of such electronic equipment is shown in FIG. 23A with an external view thereof being shown in FIG. 24A. A CPU (microcomputer) 510 has various functions, including that of controlling the entire system. An operating section 511 is designed to allow the user to operate the printer. Data such as a control program and fonts is stored in a ROM 516, and a RAM 518 functions as a work area for the CPU 510. A display panel 519 is designed to inform the user of the operational state of the printer.

Print data that is sent from another node, such as a personal computer, through a PHY device 502 and a data transfer control device 500 is sent directly to a print processing section 512 (a printer engine) over a bus 504. The print data is subjected to given processing by the print processing section 512 and is output for printing to paper by a print section (a device for outputting data) 514 comprising components such as a print head.

Figure 23B:
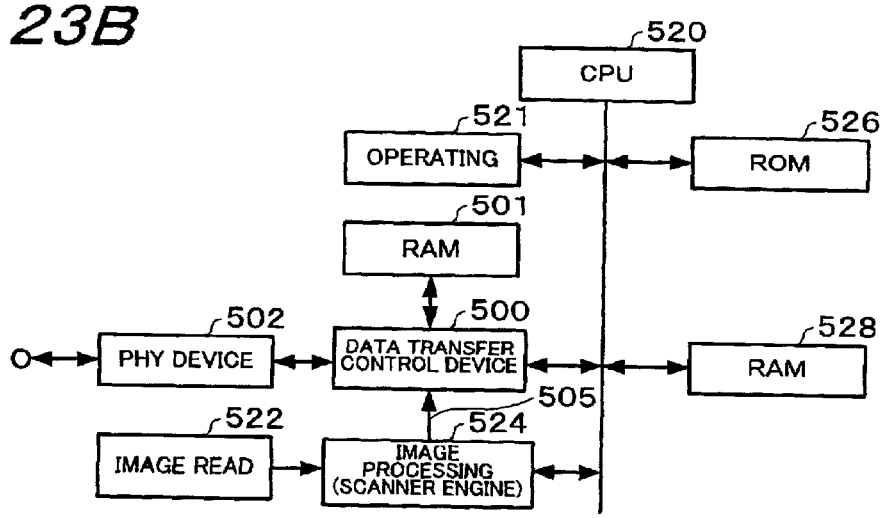
Figure 24B:
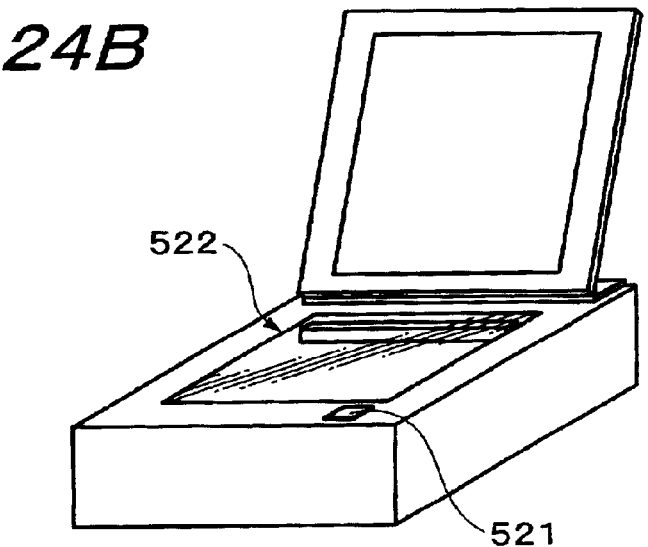

An internal block diagram of a scanner that is another example of electronic equipment is shown in FIG. 23B with an external view thereof being shown in FIG. 24B. A CPU 520 has various functions, including that of controlling the entire system. An operating section 521 is designed to allow the user to operate the scanner. Data such as a control program is stored in a ROM 526 and a RAM 528 functions as a work area for the CPU 520.

An image of a document is read in by an image read section (a device for fetching data) 522, which comprises components such as a light source and an opto-electric converter, and data of the read-in image is processed by an image processing section 524 (a scanner engine). The processed image data is sent directly to the data transfer control device 500 over a bus 505. The data transfer control device 500 creates packets by attaching headers and the like to this image data, then sends those packets through the PHY device 502 to another node such as a personal computer.

Figure 23C:
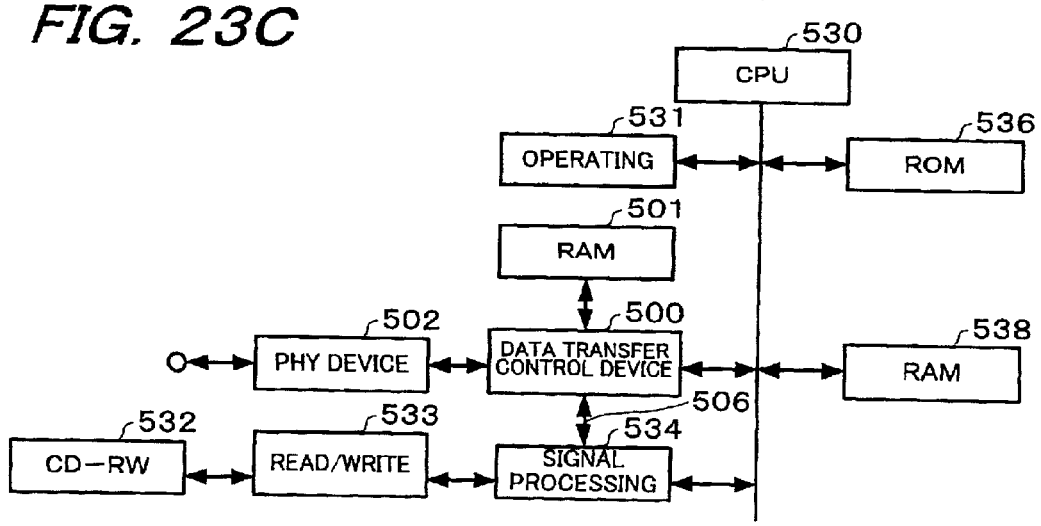
Figure 24C:
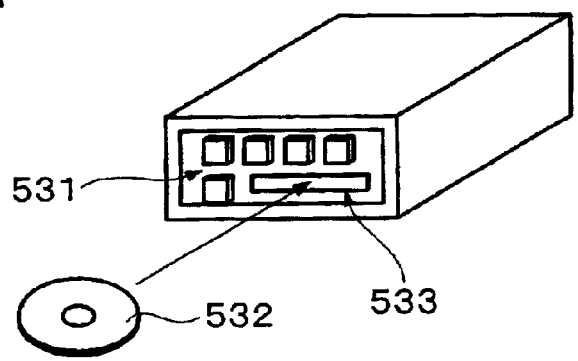

An internal block diagram of a CD-RW drive that is a further example of electronic equipment is shown in FIG. 23C with an external view thereof being shown in FIG. 24C. A CPU 530 has various functions, including that of controlling the entire system. An operating section 531 is designed to allow the user to operate the CD-RW. Data such as a control program is stored in a ROM 536 and a RAM 538 functions as a work area for the CPU 530.

Data read out from a CD-RW 532 by a read/write section (a device for fetching data or a device for storing data) 533, which comprises components such as a laser and an optical system, is input to a signal processing section 534 where it is subjected to given signal processing such as error correction. The data that has been subjected to this signal processing is sent directly to the data transfer control device 500 over a bus 506. The data transfer control device 500 creates packets by attaching headers and the like to this data, then sends those packets through the PHY chip 502 to another node such as a personal computer.

Data that has been sent in from another node through the PHY chip 502 and the data transfer control device 500, on the other hand, is sent directly to the signal processing section 534 over 1o the bus 506. The data is subjected to given signal processing by the signal processing section 534 then is stored by a read/write section 533 into the CD-RW 532.

Note that a separate CPU for data transfer control by the data transfer control device 500 could be provided in addition to the CPU 510, 520, or 530 of FIG. 23A, 23B, or 23C.

In addition, a RAM 501 (equivalent to a data buffer) is shown provided outside the data transfer control device 500 in FIGS. 23A, 23B, and 23C, but the RAM 501 could equally well be provided within the data transfer control device 500.

Use of the data transfer control device of this embodiment in electronic equipment prevents the occurrence of any inconvenience caused by a bus reset, even when such a bus reset has occurred because a new electronic device has been connected to the bus. This makes it possible to prevent erroneous operation of the electronic equipment.

In addition, use of the data transfer control device of this embodiment in electronic equipment makes it possible to perform high-speed data transfer. Therefore, if a user wishes to order a printout from a personal computer or the like, the printout can be completed with only a small time lag. Similarly, a user can see a scanned image with only a small time lag after instructing the scanner to take an image. It is also possible to read data from a CD-RW or write data to a CD-RW at high speeds.

Use of the data transfer control device of this embodiment in electronic equipment also reduces the processing load on firmware running on the CPU, making it possible to use an inexpensive CPU and low-speed buses. This enables reductions in the cost and size of the data transfer control device, thus reducing the cost and size of the electronic equipment.

Note that the electronic equipment that can employ a data transfer control device in accordance with the present invention is not limited to the above described embodiments, and thus various other examples can be considered, such as various types of optical disk drive (CD-ROM or DVD), magneto-optic disk drives (MO), hard disk drives, TVs, VCRs, video cameras, audio equipment, telephones, projectors, personal computers, electronic organizers, and dedicated wordprocessors.

Note also that the present invention is not limited to the embodiments described herein, and various modifications are possible within the scope of the invention laid out herein.

Figure 7:
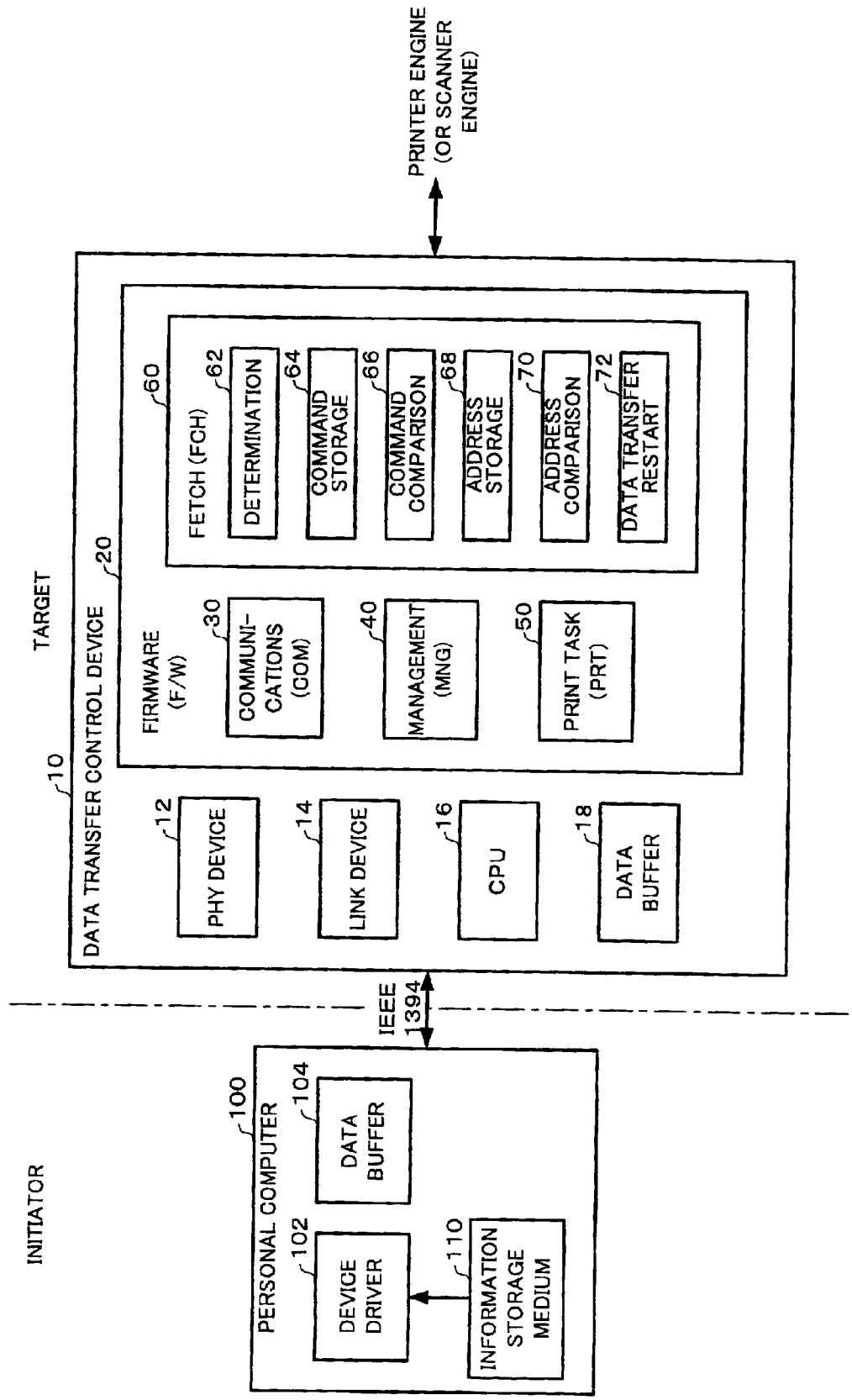
FIG. 7 shows an example of the configuration of a data transfer control device in accordance with an embodiment of the present invention.

For example, the configuration of the data transfer control device in accordance with the present invention is preferably that as shown in FIG. 7, but it is not limited thereto.

The methods described above with respect to this embodiment of the present invention for determining whether or not a bus reset has occurred during a data transfer period, for comparing commands, and for restarting the data transfer are particularly preferable, but the present invention is not limited thereto.

In addition, the present invention is particularly useful for a bus reset under the IEEE 1394, but it can also be used for any other kind of reset, provided that at least node topology information is cleared thereby.

Similarly, the present invention is preferably applied to data transfer as defined by the IEEE 1394 standard, but it is not limited thereto. For example, the present invention can also be applied to data transfer in accordance with standards that are based on a similar concept to that of IEEE 1394 or standards that are developed from IEEE 1394.

What is claimed is:

1. A data transfer control device for transferring data among a plurality of nodes that are connected to a bus, the data transfer control device comprising:

determination means for determining whether or not a reset that clears node topology information has occurred during a data transfer period between a start of data transfer with respect to another node until a completion of the data transfer;

command comparison means for comparing a content of a first command packet for a data transfer operation request that was transferred from the other node before the reset occurred and a content of a second command packet for a data transfer operation request that was transferred from the other node after the reset occurred; and restart means for restarting data transfer as a resumption of data transfer at a point at which the reset occurred, when it is determined that the reset that clears node topology information has occurred within the data transfer period and also when it is determined that the contents of the first and second command packets are the same.

2. The data transfer control device as defined in claim 1, wherein the determination means determines that the reset has occurred during the data transfer period, when the first command packet for a data transfer operation request is being processed at a point at which the reset that clears node topology information occurred, and also when data transfer has already been performed in accordance with the first command packet and no data transfer completion status has been transferred to the other node.

3. The data transfer control device as defined in claim 1, wherein the determination means sets a continuation flag to on, to indicate that data transfer is possible to restart in continuation, when it is determined that the reset that clears node topology information has occurred during the data transfer period.

4. The data transfer control device as defined in claim 1, further comprising command storage means for storing information for specifying an address for the restart of data transfer and content of the first command packet for a data transfer operation request, from after an occurrence of the reset up to the restart of data transfer.

5. The data transfer control device as defined in claim 1, wherein the command comparison means takes an initial command packet for a data transfer operation request among command packets that have been transferred from the other node after the reset that clears node topology information has occurred, to use as the second command packet for comparison with the first command packet.

6. The data transfer control device as defined in claim 1, wherein a state transition to a data transfer disabled state occurs when a data transfer completion status has been transferred to the other node but no acknowledgment has returned from the other node because of an occurrence of the reset that clears node topology information.

7. The data transfer control device as defined in claim 1, wherein transfer data that has not been transferred to the other node at a point at which the reset that clears node topology information had occurred, from within transfer data that has been transferred from an upper-layer device, is retained without being destroyed.

8. The data transfer control device as defined in claim 1, wherein the reset is a bus reset as defined by the IEEE 1394 standard.

9. A computer-usable information storage medium including a program for controlling data transfer to and from the data transfer control device defined by claim 1, the information storage medium comprising:
a program for creating a second command packet having the same content as a first command packet for a data transfer operation request that has been transferred before an occurrence of a reset that clears node topology information, in order to issue a transfer request with respect to the data transfer control device, when the reset occurs during a transfer period.

10. A computer-usable information storage medium including a program for controlling data transfer to and from the data transfer control device defined by claim 2, the information storage medium further comprising:
a program for creating a second command packet having the same content as a first command packet for a data transfer operation request that has been transferred before an occurrence of a reset that clears node topology information, in order to issue a transfer request with respect to the data transfer control device, when the reset occurs during a transfer period.

11. A computer-usable information storage medium including a program for controlling data transfer to and from the data transfer control device defined by claim 3, the information storage medium further comprising:
a program for creating a second command packet having the same content as a first command packet for a data transfer operation request that has been transferred before an occurrence of a reset that clears node topology information, in order to issue a transfer request with respect to the data transfer control device, when the reset occurs during a transfer period.

12. A computer-usable information storage medium including a program for controlling data transfer to and from the data transfer control device defined by claim 4, the information storage medium further comprising:
a program for creating a second command packet having the same content as a first command packet for a data transfer operation request that has been transferred before an occurrence of a reset that clears node topology information, in order to issue a transfer request with respect to the data transfer control device, when the reset occurs during a transfer period.

13. A computer-usable information storage medium including a program for controlling data transfer to and from the data transfer control device defined by claim 5, the information storage medium further comprising:
a program for creating a second command packet having the same content as a first command packet for a data transfer operation request that has been transferred before an occurrence of a reset that clears node topology information, in order to issue a transfer request with respect to the data transfer control device, when the reset occurs during a transfer period.

14. A computer-usable information storage medium including a program for controlling data transfer to and from the data transfer control device defined by claim 6, the information storage medium further comprising:
a program for creating a second command packet having the same content as a first command packet for a data transfer operation request that has been transferred before an occurrence of a reset that clears node topology information, in order to issue a transfer request with respect to the data transfer control device, when the reset occurs during a transfer period.

15. A computer-usable information storage medium including a program for controlling data transfer to and from the data transfer control device defined by claim 7, the information storage medium further comprising:
a program for creating a second command packet having the same content as a first command packet for a data transfer operation request that has been transferred before an occurrence of a reset that clears node topology information, in order to issue a transfer request with respect to the data transfer control device, when the reset occurs during a transfer period.

16. A computer-usable information storage medium including a program for controlling data transfer to and from the data transfer control device defined by claim 8, the information storage medium further comprising:
a program for creating a second command packet having the same content as a first command packet for a data transfer operation request that has been transferred before an occurrence of a reset that clears node topology information, in order to issue a transfer request with respect to the data transfer control device, when the reset occurs during a transfer period.

17. Electronic equipment comprising:
the data transfer control device as defined in claim 1;
a device for performing given processing on data that has been received from another node through the data transfer control device and the bus; and
a device for outputting or storing data that has been subjected to processing.

18. Electronic equipment comprising:
the data transfer control device as defined in claim 2;
a device for performing given processing on data that has been received from another node through the data transfer control device and the bus; and a device for outputting or storing data that has been subjected to processing.

19. Electronic equipment comprising:

the data transfer control device as defined in claim 3;

a device for performing given processing on data that has been received from another node through the data transfer control device and the bus; and a device for outputting or storing data that has been subjected to processing.

20. Electronic equipment comprising:

the data transfer control device as defined in claim 4;

a device for performing given processing on data that has been received from another node through the data transfer control device and the bus; and a device for outputting or storing data that has been subjected to processing.

21. Electronic equipment comprising:

the data transfer control device as defined in claim 5;

a device for performing given processing on data that has been received from another node through the data transfer control device and the bus; and a device for outputting or storing data that has been subjected to processing.

22. Electronic equipment comprising:

the data transfer control device as defined in claim 6;

a device for performing given processing on data that has been received from another node through the data transfer control device and the bus; and a device for outputting or storing data that has been subjected to processing.

23. Electronic equipment comprising:

the data transfer control device as defined in claim 7;

a device for performing given processing on data that has been received from another node through the data transfer control device and the bus; and a device for outputting or storing data that has been subjected to processing.

24. Electronic equipment comprising:

the data transfer control device as defined in claim 8;

a device for performing given processing on data that has been received from another node through the data transfer control device and the bus; and a device for outputting or storing data that has been subjected to processing.

25. Electronic equipment comprising:

the data transfer control device as defined in claim 1;

a device for performing given processing on data that is to be transferred to another node through the data transfer control device and the bus; and a device for fetching data to be subjected to processing.

26. Electronic equipment comprising:

the data transfer control device as defined in claim 2;

a device for performing given processing on data that is to be transferred to another node through the data transfer control device and the bus; and a device for taking in data to be subjected to processing.

27. Electronic equipment comprising:

the data transfer control device as defined in claim 3;

a device for performing given processing on data that is to be transferred to another node through the data transfer control device and the bus; and a device for taking in data to be subjected to processing.

28. Electronic equipment comprising:

the data transfer control device as defined in claim 4;

a device for performing given processing on data that is to be transferred to another node through the data transfer control device and the bus; and a device for taking in data to be subjected to processing.

29. Electronic equipment comprising:

the data transfer control device as defined in claim 5;

a device for performing given processing on data that is to be transferred to another node through the data transfer control device and the bus; and a device for taking in data to be subjected to processing.

30. Electronic equipment comprising:

the data transfer control device as defined in claim 6;

a device for performing given processing on data that is to be transferred to another node through the data transfer control device and the bus; and a device for taking in data to be subjected to processing.

31. Electronic equipment comprising:

the data transfer control device as defined in claim 7;

a device for performing given processing on data that is to be transferred to another node through the data transfer control device and the bus; and a device for taking in data to be subjected to processing.

32. Electronic equipment comprising:

the data transfer control device as defined in claim 8;

a device for performing given processing on data that is to be transferred to another node through the data transfer control device and the bus; and a device for taking in data to be subjected to processing.

* * * * *

UNITED STATES PATENT AND TRADEMARK OFFICE
CERTIFICATE OF CORRECTION

PATENT NO. : 6,904,022 B2
DATED : June 7, 2005
INVENTOR(S) : Kosuke Matsunaga, Hiroyuki Kanai and Shinichiro Fujita It is certified that error appears in the above-identified patent and that said Letters Patent is hereby corrected as shown below:

<u>Title page,</u>
Item [22], should read as follows:
-- Filed:  Dec. 18, 2000 --.

Signed and Sealed this

Twenty-ninth Day of November, 2005

JON W. DUDAS
*Director of the United States Patent and Trademark Office*